United States Patent [19]
Dent

[11] Patent Number: 6,151,310
[45] Date of Patent: Nov. 21, 2000

[54] DIVIDABLE TRANSMIT ANTENNA ARRAY FOR A CELLULAR BASE STATION AND ASSOCIATED METHOD

[75] Inventor: Paul W. Dent, Pittsboro, N.C.

[73] Assignee: Ericsson Inc., Research Triangle Park, N.C.

[21] Appl. No.: 08/635,359

[22] Filed: Apr. 19, 1996

Related U.S. Application Data

[63] Continuation-in-part of application No. 08/217,301, Mar. 24, 1994, and a continuation-in-part of application No. 08/439,116, May 11, 1995.

[51] Int. Cl.$^7$ .............................. H04B 7/212; H04B 7/08; H04Q 7/20
[52] U.S. Cl. ........................... 370/330; 455/561; 370/337
[58] Field of Search .................................... 370/337, 436, 370/345, 334, 329, 330, 344, 349; 455/69, 454, 132, 561, 101, 562, 503, 272, 273, 277.1, 277.2, 279.1; 375/299, 347

[56] References Cited

U.S. PATENT DOCUMENTS

| | | |
|---|---|---|
| 2,992,427 | 7/1961 | Franco . |
| 3,835,392 | 9/1974 | Mahner et al. .......................... 325/306 |

(List continued on next page.)

FOREIGN PATENT DOCUMENTS

| | | | |
|---|---|---|---|
| 0160993A2 | 5/1984 | European Pat. Off. ......... | H04Q 7/04 |
| 0201254A2 | 11/1986 | European Pat. Off. ......... | H04B 7/24 |
| 0593822A1 | 4/1994 | European Pat. Off. ....... | H01Q 25/00 |
| 2221820A | 2/1990 | United Kingdom ............. | H04B 7/06 |
| 2281011A | 2/1995 | United Kingdom ............. | H04Q 7/36 |
| WO90/03071 | 3/1990 | WIPO ............................. | H04B 7/26 |
| WO 92/02996 | 2/1992 | WIPO . | |
| WO93/12590 | 6/1993 | WIPO ............................. | H04B 7/26 |
| WO94/11958 | 5/1994 | WIPO ............................. | H04B 7/26 |

OTHER PUBLICATIONS

Wayne Tomasi, Electronic Communications Systems, Prentice Hall, In,c, and pp. 356–359, 1994.

Swales, et al., A Spectrum Efficient Cellular Base–Station Antenna Architecture, *Personal and Mobile Radio Communications Conference Coventry*, pp. 272–279 (1991).

Lee, et al., Polarization Diversity System for Mobile Radio, *IEEE Transactions on Communications*, vol. COM–20, No. 5, pp. 912–923 (Oct. 1972).

Vaughan, et al., Antenna Diversity for Mobile Communications, *Nordic Seminar on Digital Land Mobile Radiocommunication*, pp. 87–96 (Finland, 1985).

International Search Report, PCT/US 97/06492, Jul. 25, 1997.

(List continued on next page.)

*Primary Examiner*—Chau T. Nguyen
*Assistant Examiner*—Chiho Andrew Lee
*Attorney, Agent, or Firm*—Myers Bigel Sibley & Sajovec

[57] ABSTRACT

A time division multiple access base station communicates with a plurality of mobile stations in a cellular communications system using a plurality of time division multiple access (TDMA) time slots. The base station includes an antenna, a modulator, and a radio frequency switch. The antenna includes an array of transmit antenna elements. The modulator generates a first cellular radio signal for transmission during a first time division multiple access (TDMA) time slot, as well as second and third cellular radio signals for simultaneous transmission during a second time division multiple access (TDMA) time slot. In addition, the second and third cellular radio signals are generated on different frequencies. The radio frequency switch couples the first cellular radio signal to a first plurality of the transmit antenna elements during the first time division multiple access (TDMA) time slot, while coupling the second and third cellular radio signals to respective second and third pluralities of the transmit antenna elements during the second time division multiple access (TDMA) time slot.

39 Claims, 13 Drawing Sheets

U.S. PATENT DOCUMENTS

| | | |
|---|---|---|
| 4,072,956 | 2/1978 | Provencher .............................. 343/844 |
| 4,101,836 | 7/1978 | Craig et al. .............................. 325/302 |
| 4,128,740 | 12/1978 | Graziano .............................. 179/2 EB |
| 4,204,093 | 5/1980 | Yeh ............................................ 370/95 |
| 4,630,316 | 12/1986 | Vaughan .................................. 455/129 |
| 4,724,441 | 2/1988 | Fithian et al. .......................... 342/368 |
| 4,814,773 | 3/1989 | Wechsberg et al. .................... 342/368 |
| 4,823,136 | 4/1989 | Nathanson et al. .................... 342/368 |
| 4,849,990 | 7/1989 | Ikegami et al. ............................ 375/40 |
| 5,043,738 | 8/1991 | Shapiro et al. ......................... 343/700 |
| 5,166,693 | 11/1992 | Nishikawa et al. .................... 342/422 |
| 5,187,807 | 2/1993 | Alard et al. .............................. 455/17 |
| 5,191,598 | 3/1993 | Bäckström et al. .................... 375/100 |
| 5,200,759 | 4/1993 | McGinnis ............................... 343/890 |
| 5,241,690 | 8/1993 | Larsson et al. ......................... 455/522 |
| 5,276,452 | 1/1994 | Schuss et al. ........................... 342/371 |
| 5,280,631 | 1/1994 | Nakahi et al. ............................ 455/65 |
| 5,299,198 | 3/1994 | Kay et al. .............................. 370/95.3 |
| 5,301,188 | 4/1994 | Kotzin et al. ........................... 370/330 |
| 5,321,850 | 6/1994 | Backstrom et al. .................... 455/139 |
| 5,339,086 | 8/1994 | DeLuca et al. ......................... 342/371 |
| 5,369,681 | 11/1994 | Boudreau et al. ..................... 455/458 |
| 5,388,100 | 2/1995 | Ohtsuka .................................. 370/334 |
| 5,432,780 | 7/1995 | Smith et al. ............................. 370/334 |
| 5,485,631 | 1/1996 | Bruckert ................................. 370/334 |
| 5,499,395 | 3/1996 | Doi et al. ................................ 455/522 |
| 5,511,110 | 4/1996 | Drucker .................................. 455/458 |
| 5,513,183 | 4/1996 | Kay et al. .............................. 370/95.3 |
| 5,515,378 | 5/1996 | Roy, III et al. ......................... 370/334 |
| 5,528,581 | 6/1996 | De Bot ...................................... 370/19 |
| 5,557,603 | 9/1996 | Barlett et al. ........................... 370/228 |
| 5,563,610 | 10/1996 | Reudink ................................. 342/375 |
| 5,565,873 | 10/1996 | Dean ....................................... 342/372 |
| 5,579,306 | 11/1996 | Dent ........................................ 455/522 |
| 5,608,722 | 3/1997 | Miller ...................................... 370/320 |
| 5,621,752 | 4/1997 | Antonio et al. ......................... 375/200 |
| 5,724,666 | 3/1998 | Dent ........................................ 455/562 |

OTHER PUBLICATIONS

S.P. Stapleton et al., A Cellular Base Station Phased Array Antenna System, IEEE, 1993, pp. 93–96.

Carlo Caini et al., A Spectrum–and Power–Efficient EHF Mobile Satellite System to be Integrated with Terrestrial Cellular Systems, IEEE Journal On Selected Areas In Communications, vol. 10, No. 8, Oct. 1992, pp. 1315–1325.

Jean–Francois Lemieux et al., Experimental Evaluation of Space/Frequency/Polarization Diversity in the Indoor Wireless Channel, IEEE Transactions On Vehicular Technology, vol. 40, No. 3, Aug. 1991, pp. 569–574.

John L. Everett, Potential developments in hand–held satellite communication terminals, European Satellite Communications 89: Blenheim Online Publications, 1989, pp. 25–34.

S.A. Bergmann et al., Polarisation Diversity In Portable Communications Environment, Electronics Letters, vol. 22, No. 11, May 22, 1986, pp. 609–610.

Donald C. Cox et al., Cross–Polarization Coupling Measured for 800 MHz Radio Transmission In and Around Houses and Large Buildings, IEEE Transactions On Antennas And Propagation, vol. AP–34, No. 1, Jan. 1986, pp. 83–87.

Donald C. Cox, Antenna Diversity Performance in Mitigating the Effects of Portable Radiotelephone Orientation and Multipath Propagation, IEEE Transactions On Communications, vol. COM–31, No. 5, May 1983, pp. 620–628.

William C.Y. Lee, Combining Technology, Mobile Communications Engineering, Chapter 10, McGraw–Hill Book Company, 1982, pp. 291–336.

P.S. Henry et al., A New Approach to High–Capacity Digital Mobile Radio, 1981 American Telephone and Telegraph Company, The Bell System Technical Journal, vol. 60, No. 8, Oct. 1981, pp. 1891–1905.

OMNI-DIRECTIONAL          DIRECTIONAL (SECTOR)

DIVIDABLE TRANSMIT ANTENNA ARRAY FOR A CELLULAR BASE STATION AND ASSOCIATED METHOD

RELATED APPLICATIONS

The present application is a continuation-in-part of U.S. patent Application Ser. No. 08/217,301 filed Mar. 24, 1994, and U.S. patent application Ser. No. 08/439,116 filed May 11, 1995, and the disclosures of both of these applications are hereby incorporated herein in their entirety by reference.

FIELD OF INVENTION

The present invention is related to systems and methods for wireless communications, and more particularly to systems and methods for wireless cellular communications.

BACKGROUND OF THE INVENTION

Cellular communications systems are commonly employed to provide voice and data communications to a plurality of mobile units or subscribers. Analog cellular systems, such as designated AMPS, ETACS, NMT-450, and NMT-900, have been deployed successfully throughout the world. More recently, digital cellular systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Frequency reuse is commonly employed in cellular technology wherein groups of frequencies are allocated for use in regions of limited geographic coverage known as cells. Cells containing equivalent groups of frequencies are geographically separated to allow mobile units in different cells to simultaneously use the same frequency without interfering with each other. By so doing, many thousands of subscribers may be served by a system of only several hundred frequencies.

In the United States, for example, Federal authorities have allocated to cellular communications a block of the UHF frequency spectrum further subdivided into pairs of narrow frequency bands called channels. Channel pairing results from the frequency duplex arrangement wherein the transmit and receive frequencies in each pair are offset by 45 MHz. At present there are 832, 30-KHz wide, radio channels allocated to cellular mobile communications in the United States. To address the capacity limitations of this analog system a digital transmission standard has been provided, designated IS-54B, wherein these frequency channels are further subdivided into 3 time slots.

As illustrated in FIG. 1, a cellular communication system 20 as in the prior art includes one or more mobile stations or units 21, one or more base stations 23 and a mobile telephone switching office (MTSO) 25. Although only three cells 36 are shown in FIG. 1, a typical cellular network may comprise hundreds of base stations, thousands of mobile stations and more than one MTS0. Each cell will have allocated to it one or more dedicated control channels and one or more voice channels. A typical cell may have, for example, one control channel, and 21 voice/data, or traffic, channels. The control channel is a dedicated channel used for transmitting cell identification and paging information. The traffic channels carry the voice and data information.

The MTSO 25 is the central coordinating element of the overall cellular network 20. It typically includes a cellular processor 28, a cellular switch 29 and also provides the interface to the public switched telephone network (PSTN) 30. Through the cellular network 20, a duplex radio communication link 32 may be effected between two mobile stations 21 or, between a mobile station 21 and a landline telephone user 33. The function of the base station 23 is commonly to handle the radio communication with the mobile station 21. In this capacity, the base station 23 functions chiefly as a relay station for data and voice signals. The base station 23 also supervises the quality of the link 32 and monitors the received signal strength from the mobile station 21.

A typical base station 23 as in the prior art is schematically illustrated in FIG. 2 which shows, as an example, the functional components of model number RBS 882 manufactured by Ericsson Telecom AB, Stockholm, Sweden for the CMS 8800 cellular mobile telephone system. A full description of this analog cellular network is provided in publication number EN/LZT 101 908 R2B, published by Ericsson Telecom AB.

A now common sight along many highways, the base station 23 includes a control unit 34 and an antenna tower 35. The control unit 34 comprises the base station electronics and is usually positioned within a ruggedized enclosure at, or near, the base of the tower. Within this enclosure are the radio control group 37, or RCG, an exchange radio interface (ERI) 38 and a primary power supply 41 for converting electric power from the AC grid to power the individual components within the base station 23, and a backup power supply 42.

The ERI 38 provides signals between the MTS0 25 and the base station 23. The ERI 38 receives data from the RCG 37 and transfers it to the MTSO 25 on a dedicated MTS0-BS link 45. In the reverse direction, the ERI 38 receives data from the MTSO 25 and sends it to the RCG 37 for subsequent transmission to a mobile station 21.

The radio control group 37 includes the electronic equipment necessary to effect radio communications. A functional block diagram of an RCG 37 as in the prior art is shown in FIG. 3. The configuration shown illustrates one control channel transmit/receive module (TRM) 51, a number of voice channel TRMs 52, and one signal strength receiver 53, as is a typical configuration required to serve one cell or sector of a cell. Each TRM 51, 52 includes a respective transmitter 54, receiver 55 and control unit 57. The TRMs 51, 52 are not typically frequency agile and operate instead on only one predetermined channel. Control signals from the ERI 38 are received by the individual control units 57. Voice and data traffic signals are routed over a separate interface to the ERI 38.

Each individual transmitter 54 for control and voice is connected to a transmit combiner 58. The transmit combiner combines all of the input signals onto a single output coupled through a coaxial cable 62 to the transmit antenna 63. Through the use of the combiner 58, up to 16 transmitters 54 can typically be connected to a common transmit antenna 63. The combiner 58 is used because there is often a premium for space on the masts and towers used to support the antennas. In an extreme case, one mast may be required to support over 100 radio channels.

On the receive side, each of two receive antennas 65 is coupled to a respective receive combiner 66A, 66B where the signals received are separated according to frequency and passed on to the individual receivers 55 in each of the TRMs 51, 52. The two receive antennas 65 are typically spaced 3 to 5 meters apart on the tower so that they may receive signals with uncorrelated fading patterns to thereby provide space diversity reception. There are many conventional techniques for both pre-detection and post-detection diversity which are described, for example, in Chapter 10 of the book entitled "Mobile Communications Engineering", by William C. Y. Lee, published by McGraw-Hill, 1992.

One visible feature of a typical base station 23 is the antenna tower 35. In order to achieve a reasonable coverage area, the antennas 63, 65 are desirably mounted at some distance above the ground. Referring now additionally to the prior art schematic plan view illustration of FIG. 4A, in rural areas the towers 35 are commonly located at the center of a cell 36 thereby providing omni-directional coverage. In an omni-directional cell, the control channel(s) and the active voice channel(s) are broadcast in all areas of the cell— usually from a single antenna. Where base stations 23 are more densely located, a sectorized antenna system may be employed as in the prior art, and shown by the schematic diagram of FIG. 4B. Sectorization requires directional antennas 70 having, for example, a 120 degree radiation pattern as illustrated in FIG. 4B. Each sector 71 is itself a cell having its own control channel(s) and traffic channel(s). Note that "channel" may refer to a specific carrier frequency in an analog system or to a specific carrier/slot combination in a hybrid TDMA/FDMA system, such as IS-54 and GSM.

FIG. 5A illustrates a typical antenna system as in the prior art and as discussed above. FIG. 5B illustrates two types of prior art antennas that have been heretofore discussed—an omni-directional antenna, such as a dipole 66, and a directional sector antenna 70 which further includes a reflector 64, for example. It being understood that transmit and receive antennas are typically of the same type for a given base station.

The use of scanning phased array antennas in cellular communications systems has been proposed. For example, Stapleton, et al., *A Cellular Base Phased Array Antenna System*, Proceedings of the 93rd IEEE VTC, pp. 93–96 describe a circular array of monopole radiating elements to provide 360 degree scanning capability. Stapleton's antenna is designed such that each radiating element has the potential of transmitting on every channel allocated to the cell.

It should be noted that passive microstrip arrays are also currently available for use with cellular base stations. For example, type no. 1309.41.0009 manufactured by Huber+ Suhner AG of Herisau, Switzerland is a seven element linearly polarized flat panel passive antenna with a shaped elevation beam for use in cellular base stations. This array can replace the typical dipole antenna and is more suitable for locations on the sides of buildings or other flat surfaces. In application note 20.3, published by Huber+Shuner, it is shown that wide area coverage may be obtained via the use of power-splitters whereby portions of the signals are diverted to several individual panels.

Notwithstanding the above mentioned cellular base stations, there continues to exist a need in the art for base stations having enhanced cellular communications capacities and reduced cost.

SUMMARY OF THE INVENTION

The present invention is a base station including an antenna that can transmit fewer channels at higher power or more channels at lower power during each TDMA time slot allowing a dynamic allocation of antenna resources according to range, number and locations of active mobile stations. In particular, the antenna can transmit one high power cellular radio signal during a first TDMA time slot, two medium power cellular radio signals during a second TDMA time slot, and four low power cellular radio signals during a third TDMA time slot. Accordingly, the base station can transmit the high power cellular radio signal to a mobile station near the limit of the transmit coverage area, transmit the two medium power cellular radio signals to two mobile stations at medium distances from the base station, and transmit the four low power cellular radio signals to four mobile stations relatively close to the base station. The first, second and third time slots used at respectively high, medium and low power can be tailored to the mobile distribution.

The antenna can transmit the high, medium, and low power cellular radio signals using available cellular frequencies. For example, the high power cellular radio signal can be transmitted over frequency $f_1$, the two medium power cellular radio signals can be transmitted over frequencies $f_1$ and $f_2$, and the four low power cellular radio signals can be transmitted using frequencies $f_1$, $f_2$, $f_3$, and $f_4$. This allocation of frequencies in a first base station allows the use of the same four frequencies in an adjacent base station. For example, at the second base station, the high power cellular radio signal can be transmitted using frequency $f_4$, the two medium power cellular radio signals can be transmitted using frequencies $f_3$ and $f_4$, and the four low power cellular radio signals can be transmitted using frequencies $f_1$, $f_2$, $f_3$, and $f_4$. The possibility of interference between the two base stations is reduced because the high and medium power radio signals for each antenna operate on different frequencies. The only duplication of frequencies occurs with respect to the low power cellular radio signals which do not overlap coverage areas of adjacent base stations.

In one embodiment of the present invention, a time division multiple access base station for communicating with a plurality of mobile stations in a cellular communications system using a plurality of time division multiple access time slots includes an antenna having an array of transmit antenna elements, a modulator, and a radio frequency switch. The modulator generates a first cellular radio signal for transmission during a first time division multiple access time slot as well as second and third cellular radio signals for simultaneous transmission during a second time division multiple access time slot. In addition, the second and third cellular transmit channels are generated on different frequencies. The radio frequency switch couples the first cellular radio signal to a first plurality of transmit antenna elements during the first time division multiple access time slot, and then couples the second and third cellular radio signals to respective second and third pluralities of transmit antenna elements during the second time division multiple access time slot. Accordingly, the base station can transmit different numbers of cellular radio signals during different time division multiple access time slots while each antenna element continues to radiate energy only at a single frequency. This facilitates the construction of active transmit elements using efficient Class-C power amplifiers that only amplify a single frequency at a time without causing unwanted intermodulation.

Preferably, the second and third pluralities of transmit antenna elements comprise respective subsets of the first plurality of transmit antenna elements so that the first cellular radio signal is transmitted at a higher power than the second and third cellular radio signals. Accordingly, one cellular radio signal can be transmitted during one time division multiple access time slot while more lower power cellular radio signals can be transmitted simultaneously during another time division multiple access time slot. This power allocation can be achieved by an antenna wherein each transmit antenna element is a patch antenna element, preferably connected to a respective Class-C transmit amplifier. Accordingly, a high power cellular radio signal can be transmitted by using all patch antenna elements simultaneously, and lower power cellular radio signals can be transmitted by using only a portion of the active patch antenna elements. Several mobiles may thus receive service on the same frequency during different time division multiple access time slots. Furthermore, multiple mobile stations may receive service on different frequencies during the same time division multiple access time slot.

In addition, the base station may generate fourth, fifth, sixth, and seventh cellular radio signals on different frequencies for transmission during a third time division multiple access time slot. The radio frequency switch couples the fourth, fifth, sixth, and seventh cellular radio signals to respective fourth, fifth, sixth, and seventh pluralities of transmit antenna elements during a third time division multiple access time slot. Accordingly, each of the fourth through seventh cellular radio signals may be transmitted at a lower power than each of the first through third cellular radio signals.

The antenna preferably defines a first transmit coverage area over which the first, second, and third cellular transmit channels are transmitted. In addition, the base station may include a second antenna defining a second transmit coverage area overlapping at least a portion of the first transmit coverage area. This second antenna transmits a broadcast control signal over a predetermined frequency during a predetermined time division multiple access time slot. Furthermore, energy is transmitted from the second antenna over the predetermined frequency during every time division multiple access time slot at a predetermined power level. Accordingly, the base station may transmit a broadcast control signal which conforms to the GSM standard protocol, which requires that the control signal be transmitted over a frequency with constant power in all time slots.

In an alternate embodiment, the base station includes an antenna comprising an array of transmit antenna elements, high power transmit means, and low power transmit means. The high power transmit means transmits a high power cellular radio signal from a first plurality of the transmit elements during a first time division multiple access time slot. The low power transmit means transmits a low power cellular radio signal from a second plurality of the transmit antenna elements during a second time division multiple access time slot. Accordingly, high and low power cellular radio signals can be accommodated during different time division multiple access time slots. Furthermore, the second plurality of transmit elements is preferably less than the first plurality of transmit elements so that the high power cellular radio signal is transmitted at a higher power than the low power cellular radio signal. Accordingly, multiple low power cellular radio signals can be transmitted from the antenna at the same time. In addition, the low power cellular radio signals can be transmitted with a broader vertical beam pattern than the high power cellular radio signal in order to provide better coverage to mobile stations relatively close to the base station which may be at a negative elevation angle relative to the antenna.

In yet another embodiment of the present invention, a cellular system for communicating with a plurality of mobile stations includes a first base station having a first antenna, and a second base station adjacent the first base station having a second antenna. The first antenna of the first base station transmits a first cellular radio signal at a first cellular frequency. The second antenna of the second base station transmits a second cellular radio signal at a second cellular frequency at high power and transmits a third cellular radio signal at the first cellular frequency at low power to reduce interference between the first and third cellular radio signals while reusing the first frequency at both base stations. In particular, the first antenna may define a first transmit coverage area over which the first cellular radio signal is transmitted, and the second antenna may define a second transmit coverage area over which the second cellular radio signal is transmitted. The second antenna also defines a third transmit coverage area over which the third cellular radio signal is transmitted, and the first and second transmit coverage areas overlap while the first and third transmit coverage areas do not overlap. Accordingly, adjacent cellular base stations may share common transmit frequencies during the same TDMA time slots without significant interference between the two.

As discussed above, the present invention allows the transmission of fewer cellular radio signals at higher power or more cellular radio signals at lower power during a single time division multiple access time slot. Accordingly power and capacity trade-offs can be made for each time division multiple access time slot based on the number and locations of active mobile stations in the transmit coverage area for a base station. That is, a fewer number of cellular radio signals with more power can be used to transmit to mobile stations at a greater distance from the base during one time division multiple access time slot, while a greater number of less powerful cellular radio signals can be used to transmit to more mobile stations a shorter distance from the base station during a second time division multiple access time slot.

In addition, the allocation of cellular radio signals by frequency and power at a first base station allows the duplication of the same frequencies in an adjacent base station without causing significant interference between the two by arranging that the same frequencies are not transmitted at high power at the same time. Furthermore, the use of patch antenna elements which can be divided into arrays allows the invention to be implemented at a relatively low cost.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to one having skill in the art. Like numbers refer to like elements throughout.

Figure 1:
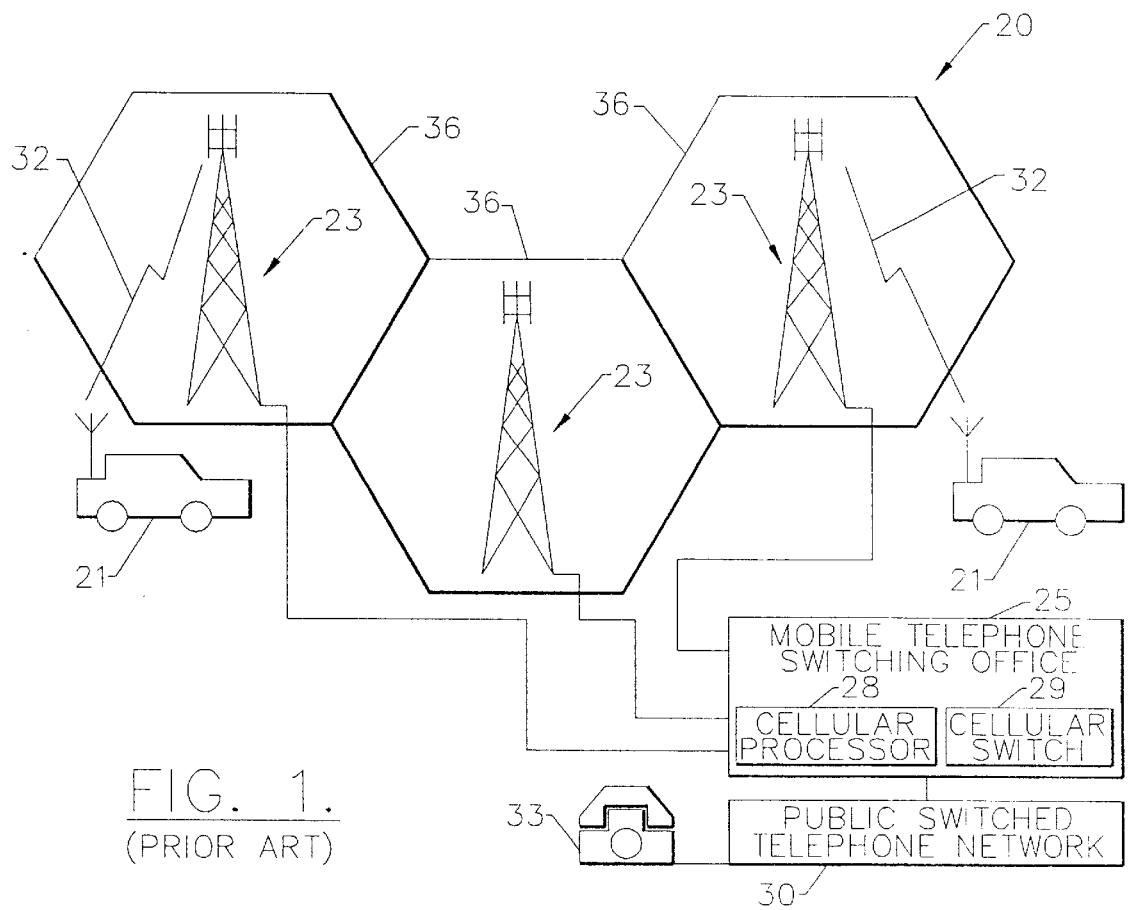
FIG. 1 is a schematic block diagram illustrating the basic components of a cellular communications system as in the prior art.
Figure 2:
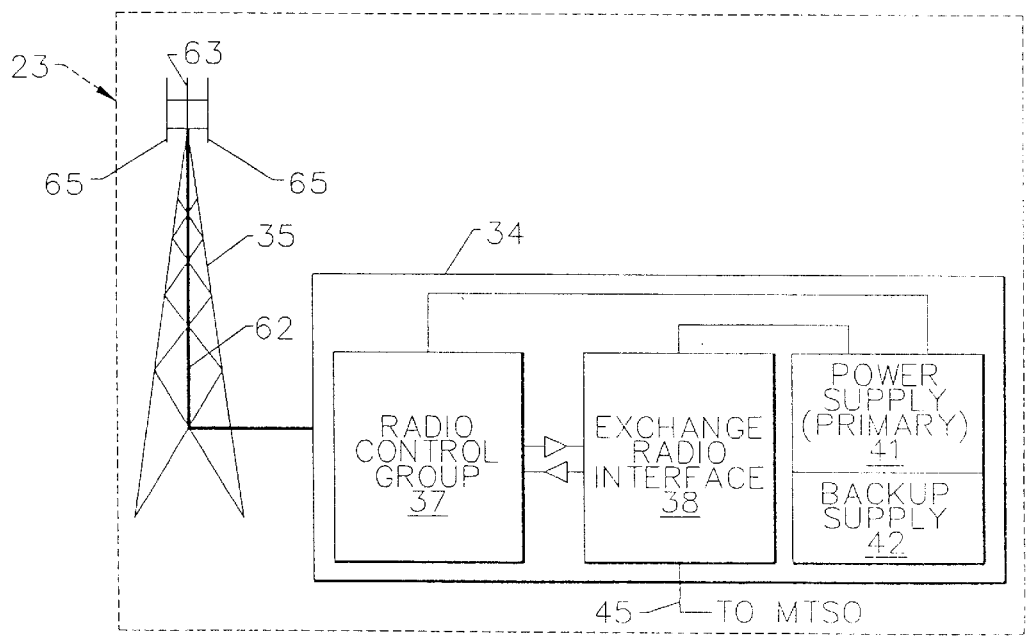
FIG. 2 is a schematic block diagram illustrating the functional components of a cellular communications base station as in the prior art.
Figure 3:
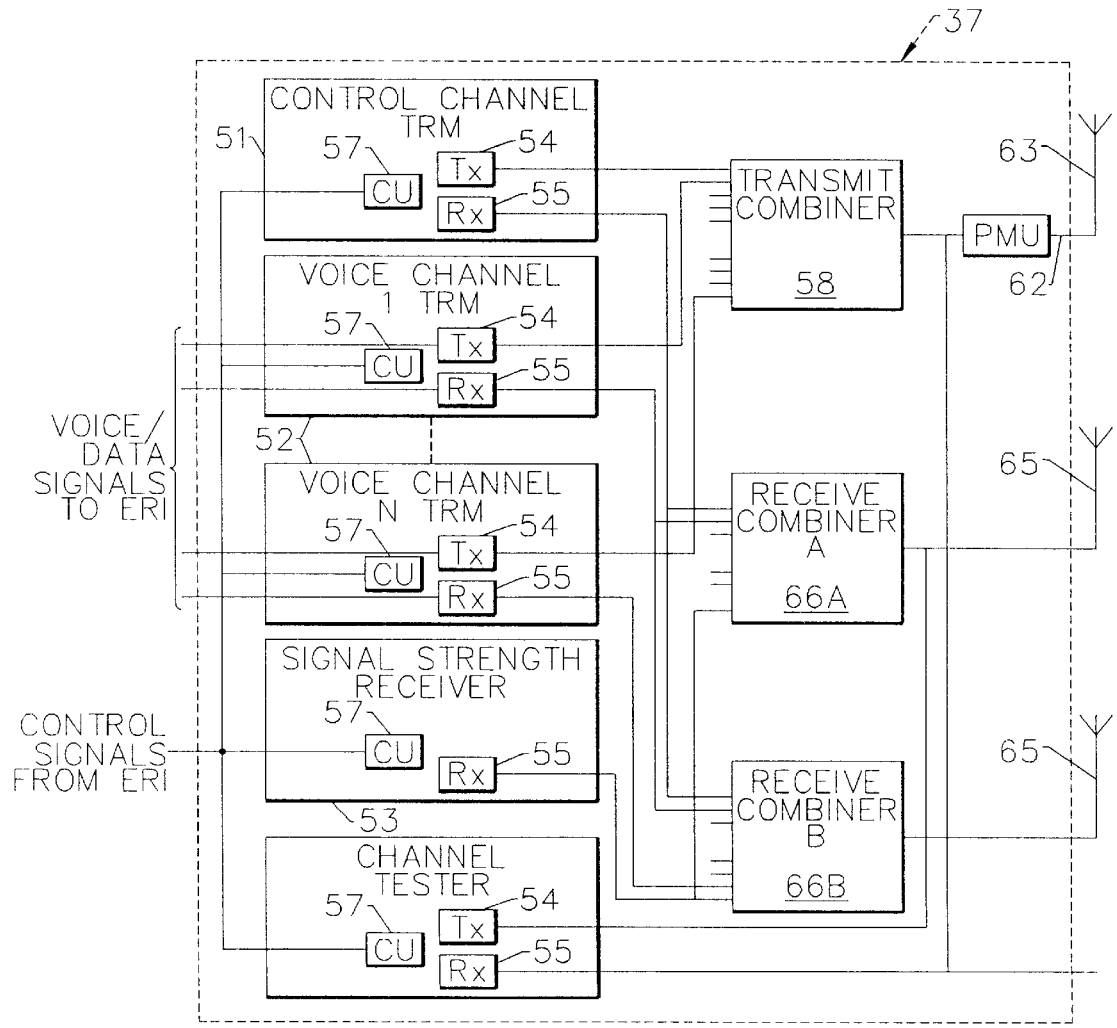
FIG. 3 is a schematic block diagram illustrating the functional elements of Radio Control Group of a base station as in the prior art.
Figure 4A:
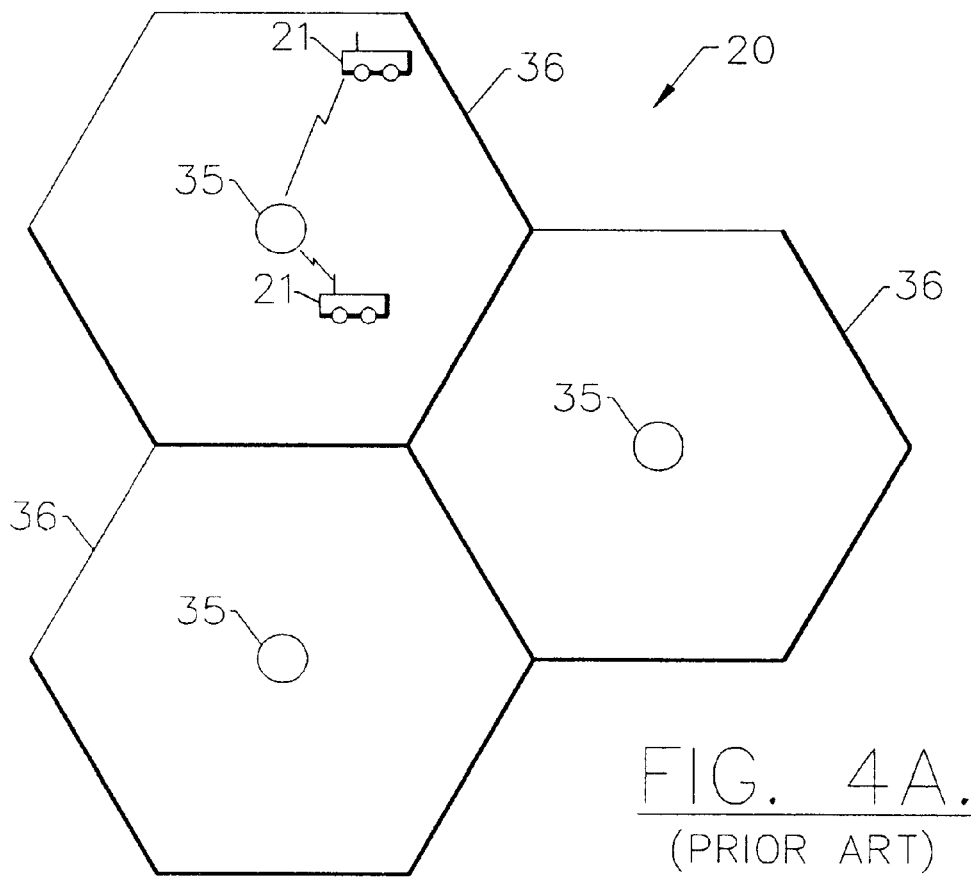
FIG. 4A is a schematic plan view illustrating an omnidirectional cellular pattern as in the prior art.
Figure 4B:
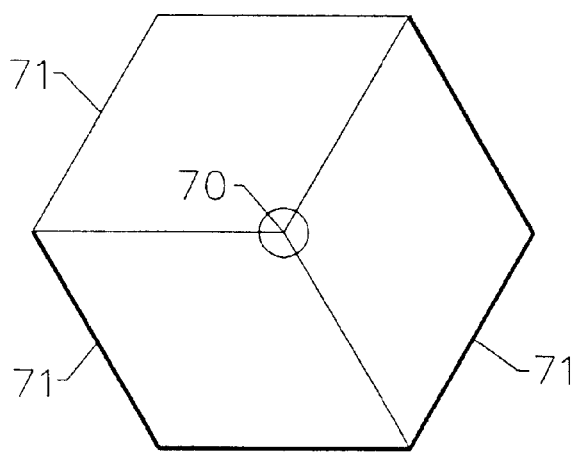
FIG. 4B is a schematic plan view illustrating a sectorized cellular pattern as in the prior art.
Figure 5A:
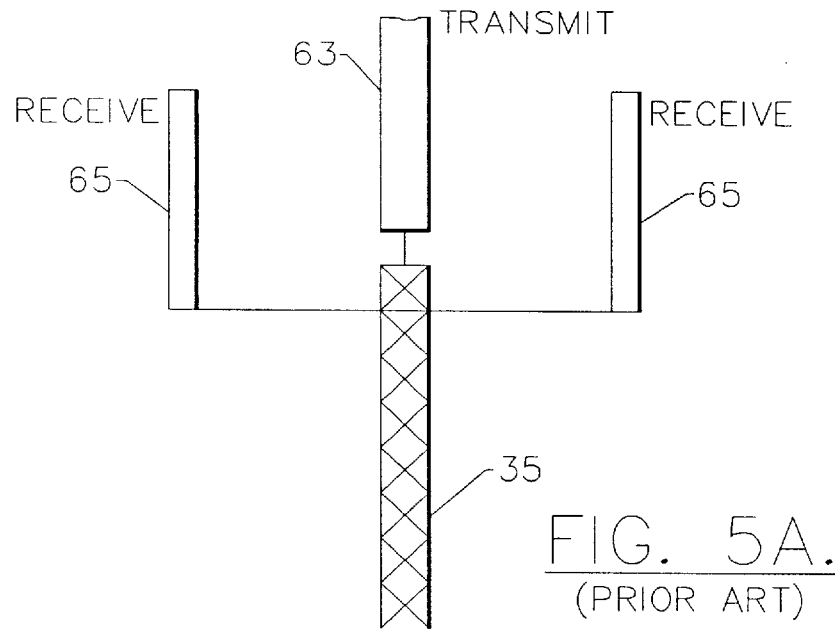
FIG. 5A is a schematic side view illustrating a typical cellular antenna system as in the prior art.
Figure 5B:
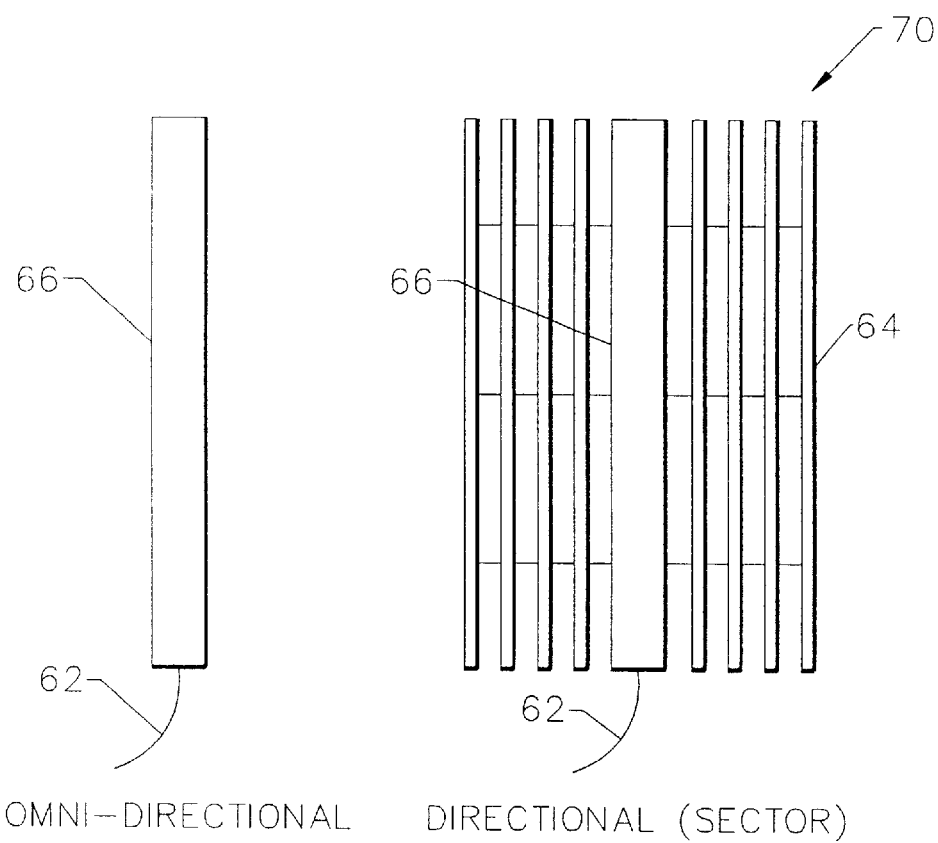
FIG. 5B is a schematic side view illustrating an omnidirectional antenna and a sector antenna as in the prior art.
Figure 6:
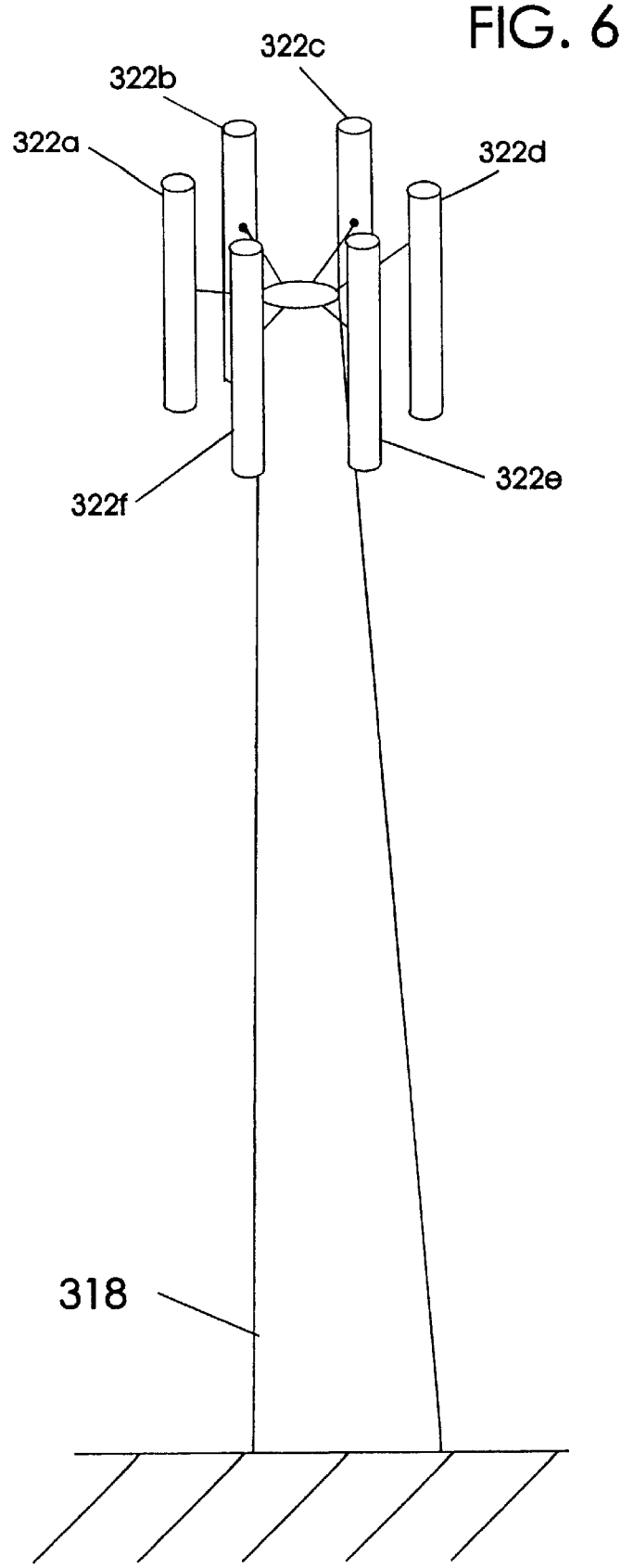
FIG. 6 is a plan view of a base station including a plurality of antennas according to the present invention.
Figure 7:
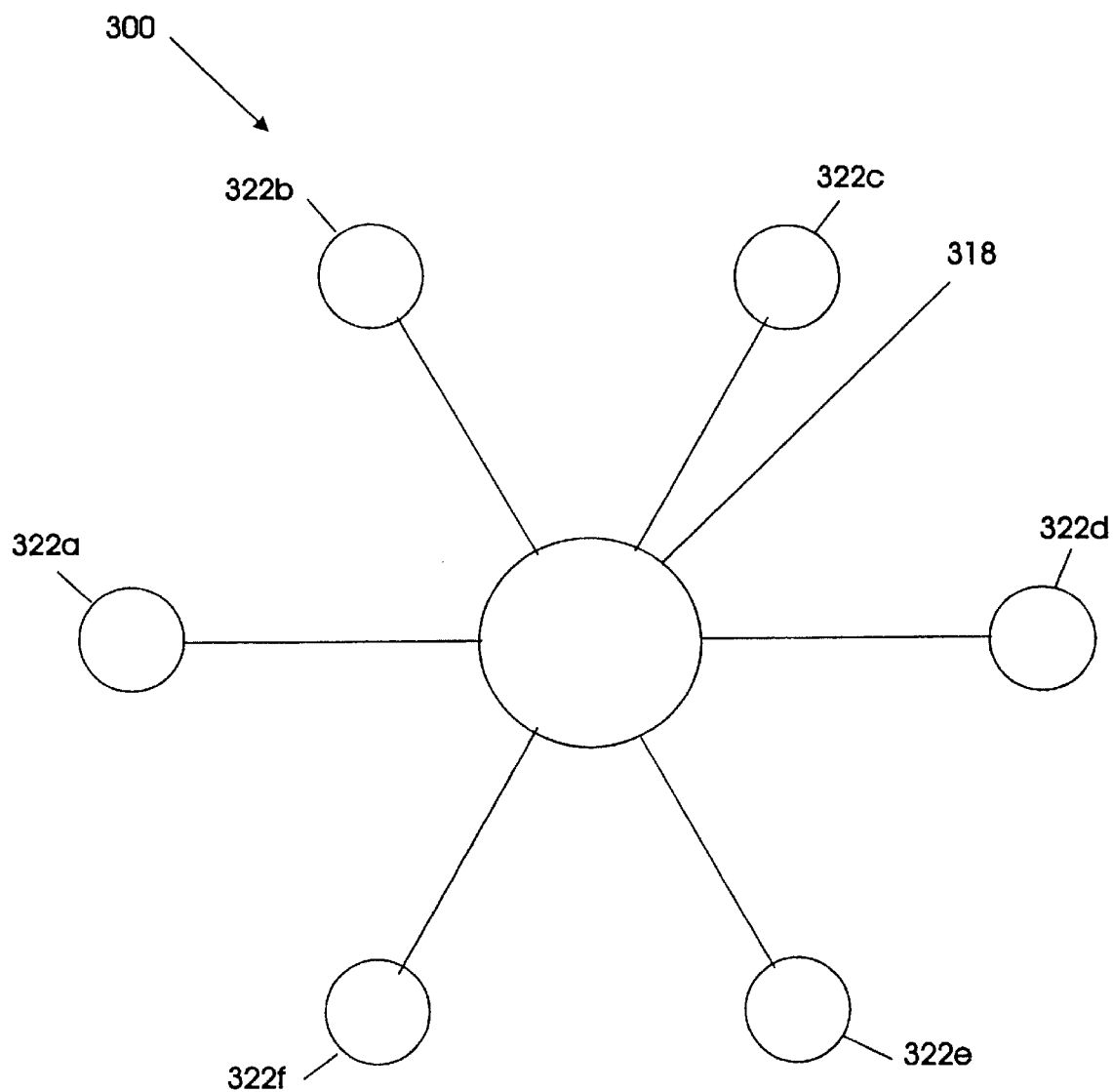
FIG. 7 is a top view of the base station of FIG. 6.

Referring first to FIGS. 6 and 7, a base station 300 including a plurality of antennas 322a–f is described. The antennas are arranged in a cylindrical pattern to transmit signals to any direction. Each of the six antennas preferably defines a transmit coverage area extending out from the base station on the order of 120° in azimuth. Accordingly, the six antennas can be equally spaced around the base station at 60° intervals so that adjacent antennas define overlapping transmit coverage areas. Furthermore, the base station is preferably a time division multiple access (TDMA) base station wherein each antenna can transmit multiple cellular radio signals over a frequency which is divided into time slots. In other words, each cellular radio signal is transmitted over a separate communications channel defined by a time slot and a frequency.

In addition, the six antennas on the base station are preferably divided into two groups. The first group includes antennas 322a, 322c, and 322e, and each of these antennas can transmit one cellular radio signal at one frequency at high power, transmit two cellular radio signals at two frequencies at medium power, or transmit four cellular radio signals at four frequencies at low power during any time division multiple access (TDMA) time slot. Accordingly, a single one of these antennas can transmit one cellular radio signal at high power to a cellular mobile station near the limit of the transmit coverage area during one TDMA time slot, two channels at medium power to two cellular mobile stations located an intermediate distance from the antenna during a second TDMA time slot, and transmit four channels at low power to four cellular mobile stations located relatively close to the antenna during a third TDMA time slot. The base station can thereby dynamically allocate frequencies and power TDMA time slot by TDMA time slot according to the number of active mobile cellular stations within the transmit coverage area and the distance of these active mobile stations from the base station. Furthermore, by allocating four frequencies to each of these antennas, the base station can dynamically allocate frequencies and power levels over the entire transmit coverage area for the base station. The four frequencies used by each antenna may also be varied from TDMA frame to TDMA frame according to a frequency hopping algorithm defined by the GSM standards.

The second antenna array includes antennas 322b, 322d, and 322f, and each of these antennas can transmit a single frequency at high power during every TDMA time slot. Preferably, one of the TDMA time slots for each of these antennas is dedicated to a broadcast control signal, and energy is always transmitted in each of the other time slots at the same high power, thus allowing the broadcast control signal to be identified more rapidly when a cellular mobile station first enters into the respective receive coverage area. By evenly spacing the antennas in the second array around the base station, a broadcast control signal can be received by a cellular mobile station anywhere within the transmit coverage area of the base station. In particular, this arrangement supports the transmission of a broad cast control signal on a fixed frequency with a constant energy level as required by the GSM standard protocol. Thus, a base station according to the invention can support both frequency hopping and non-hopping channels.

Figure 8:
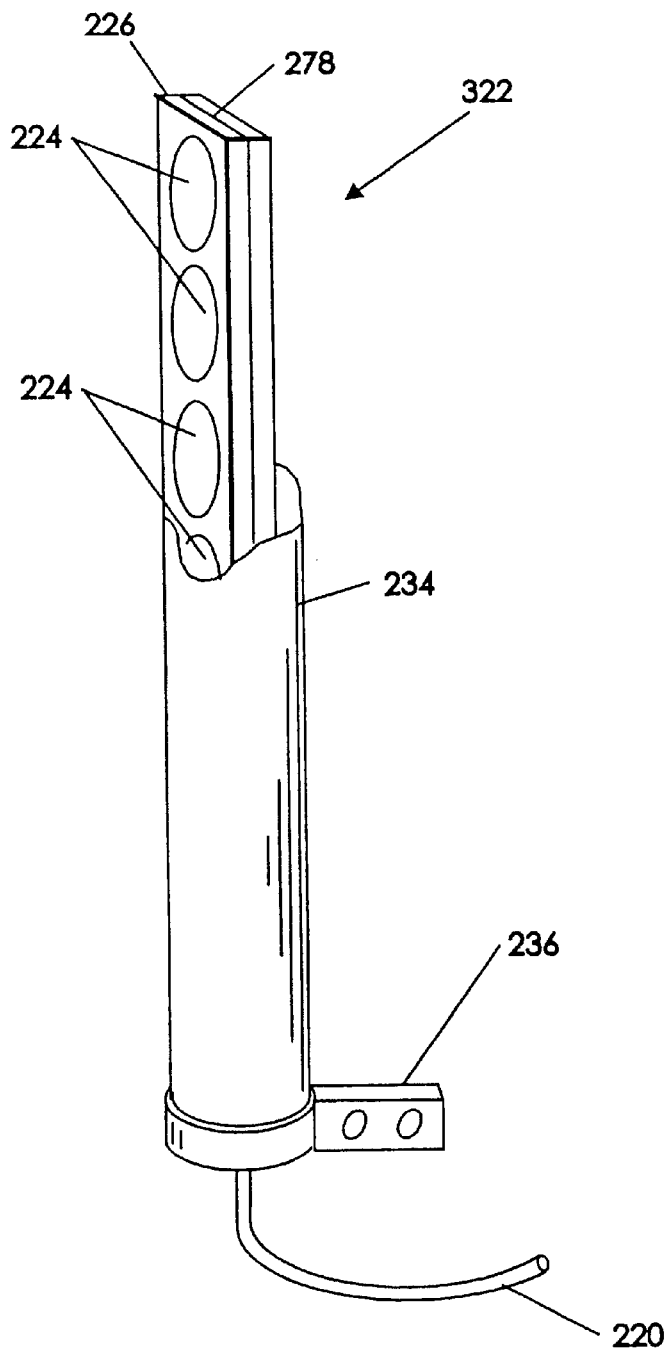
FIG. 8 is a cut away view of an antenna including a plurality of patch antenna elements on an elongate substrate according to FIG. 7.
Figure 9:
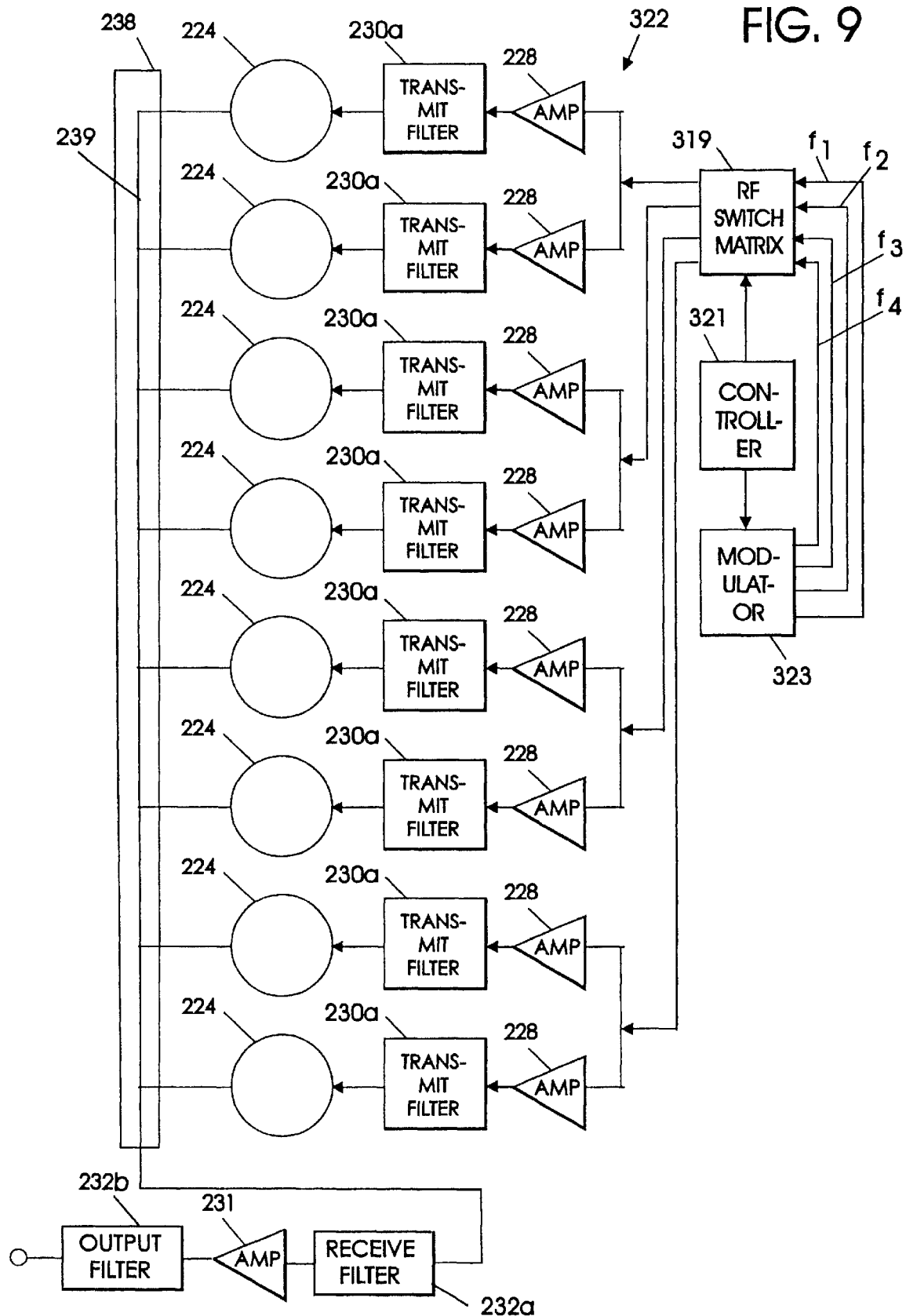
FIG. 9 is a schematic view of an antenna according to FIG. 8.

Each of the antennas 322a–f preferably includes a plurality of transmit antenna elements for transmitting signals which can have a predetermined rotational polarization. These antenna elements are arranged in a predetermined pattern to define respective transmit coverage areas for each of these antennas. The antenna elements may be circular patch antenna elements (as illustrated in FIGS. 8 and 9) or crossed dipoles as would be readily understood by one having skill in the art. In addition, these antenna elements may serve simultaneously as receive antenna elements. Antenna mounting means, such as the illustrated antenna mast 318, is preferably provided for mounting the antennas so that the adjacent receive coverage areas defined by adjacent antennas are overlapping.

A cut away of a single antenna 322 is illustrated in FIG. 8. In a preferred embodiment, the antenna includes a plurality of printed circuit board antenna elements 224, such as patch antenna elements. The patch antenna elements 224 are provided on an elongate substrate 226 such as a printed circuit board, and these patch antenna elements can be used as transmit and receive elements simultaneously. The elongate substrate can also be provided with other components such as input amplifiers 228, a transmit filter 230a, an output or receive low noise amplifier ("LNA") 231, and an output filter 232b or receive filter 232a, as illustrated schematically in FIG. 9. As further illustrated in FIG. 8, the elongate substrate 226, with patch antennas 224 is preferably enclosed in a radio-transparent tubular housing 234. A mounting bracket 236 can be used to connect the antenna to the base station mast, and the cable 220 can be used to connect the antenna 322 to cellular receivers. In addition, a temperature sensor and heater can be included within the housing for colder climates.

As shown schematically in FIG. 9, a radio frequency (RF) switch matrix 319 distributes transmit signals to the transmit power amplifiers 228. As would be readily understood by one having skill in the art, the transmit amplifiers are preferably single carrier power amplifiers (SCPA's) (such as Class-C power amplifiers) for amplifying the Time Division Multiple Access (TDMA) signal. In the case that SCPA's are used, a signal is directed towards a single principle direction on a single frequency. In the receive direction, however, the receive low noise amplifier 231 is preferably always capable of receiving and amplifying signals on multiple frequencies. Each antenna element 224 is also coupled by coupling circuit 238 including coupling line 239 to a common receive filter 232a and low-noise receive amplifier 231.

The RF switch matrix 319 has inputs for four transmit signals, each transmit signal having a separate cellular frequency $f_1$–$f_4$, and each transmit amplifier 228 drives respective transmit antenna elements 224. The RF switch matrix 319 can apply one transmit signal at one cellular frequency $f_1$ to all of the transmit amplifiers 228 during one TDMA time slot to transmit one cellular radio signal at high power (Mode 1 Operation). The RF switch matrix can then apply one transmit signal at one cellular frequency $f_1$ to four of the transmit amplifiers while applying a second transmit signal at a second cellular frequency $f_2$ to the remaining four transmit amplifiers during a second TDMA time slot to transmit two cellular radio signals at medium power (Mode 2 Operation). The RF switch matrix can then apply four transmit signals having respective cellular frequencies $f_1$–$f_4$ to two respective transmit amplifiers each during a third TDMA time slot to transmit four cellular radio signals at low power (Mode 3 Operation).

In general, the RF switch may be controlled by two binary bits that determine for each output which of the four input signals will be passed to that output. Eight bits are thus required to control all four outputs. One 8-bit byte determines the array configuration for each time slot so that 8, 8-bit bytes determine the configuration during a TDMA frame. This information may be stored in a memory in the switch and retrieved cyclically in synchronism with the TDMA frame, and only changed by controller 321 when the allocation of array elements to time slots and frequencies is to be changed.

A controller 321, which is operatively connected to the RF switch matrix, determines for each TDMA time slot the number of cellular radio signals to be transmitted, the frequencies at which the cellular radio signals are to be transmitted, and the power for each cellular radio signal, based on the number and location of active cellular mobile stations in the receive coverage area of the antenna. After determining the allocation of signals for a TDMA time slot, the controller preferably generates a digital control code designating which inputs to the RF switch matrix are to be applied to which transmit amplifiers. The digital code is applied to the RF switch for each TDMA time slot. As an example, the digital code can be an eight bit control byte which is sufficient to define each of the possible RF switch input and transmit amplifier combinations. As will be understood by one having skill in the art, the controller 321 can be implemented as a special purpose computer, a general purpose computer with special purpose software, special purpose hardware, or combinations thereof.

A modulator 323 encodes cellular digital information on each of the cellular frequencies used during each TDMA time slot. As discussed above, the controller 321 determines the number of channels required for each TDMA time slot, as well as the frequency and power for each channel at each time slot, based on the number and locations of active mobile cellular stations in the respective transmit coverage area. Accordingly, information is sent from the controller to the modulator 323 for each TDMA time slot instructing the modulator 323 as to which frequencies should be encoded with which transmit signal thereby allocating the cellular communications transmit channels for each time slot.

The transmit amplifiers 228 may produce wideband noise outputs at frequencies overlapping the receive frequency band that are of a sufficient magnitude to degrade the noise figure of the receive low noise amplifier 231. Accordingly, a transmit filter 230a and receive filter 232a can be used as illustrated. The receive filter 232a may be a bandpass filter tuned to pass the receive frequency band and attenuate transmit frequency signals, while the transmit filter 230a can be a notch filter to attenuate transmission in the receive frequency band and pass the transmit frequency band.

Figure 10:
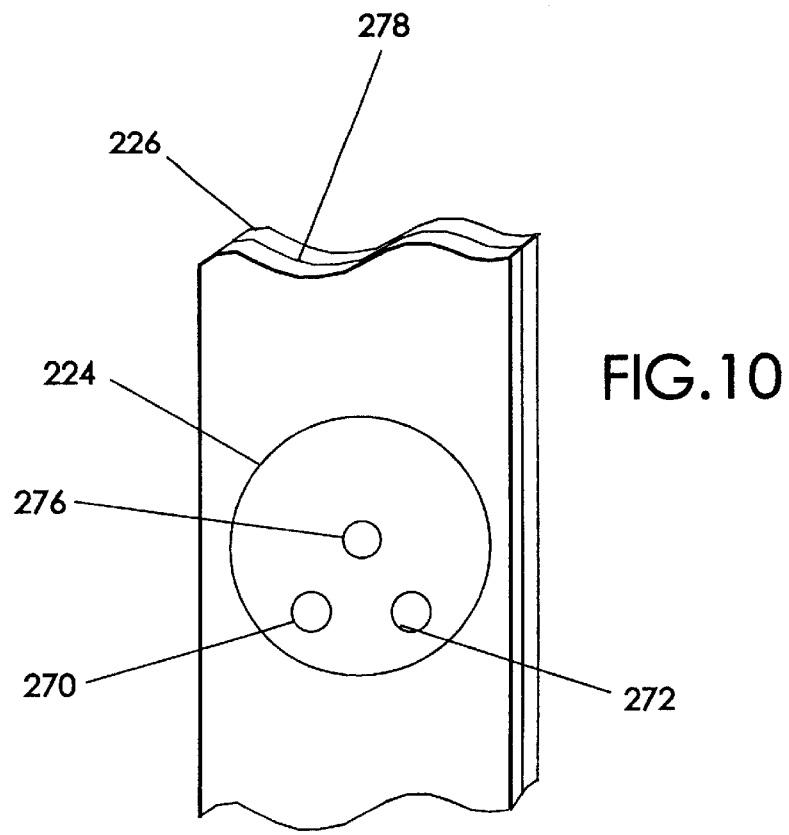
FIG. 10 is a front perspective view of a single patch antenna element on an elongate substrate according to FIG. 8.
Figure 11:
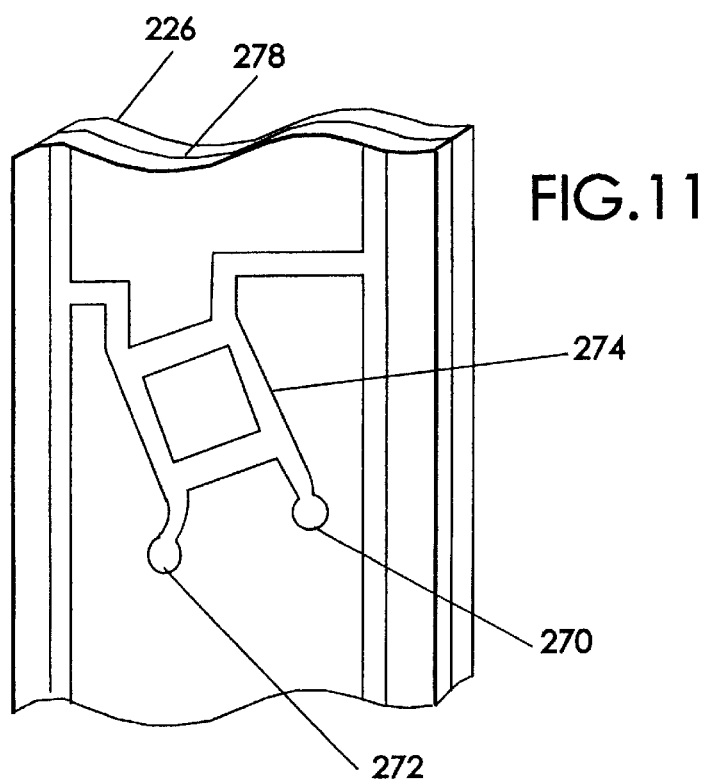
FIG. 11 is a back perspective view of a single patch antenna element on an elongate substrate according to FIG. 8.

As will be understood by one having skill in the art with reference to FIG. 8, each antenna is preferably fabricated separately on an elongate substrate 226 such as a long thin module or printed circuit board. Printed circuit board antenna elements, such as patch antennas, may be readily fabricated as part of such a module as would be readily understood by one having skill in the art. As shown in FIGS. 10 and 11, a circular patch antenna element 224 may be fed at two feed points 270 and 272, and the two feed points connected to a printed, branch-line quadrature coupler 274 to provide two feed points 270 and 272 of opposite circular or rotational polarization. A ground connection 276 can be used to connect the antenna element 224 to a ground plane 278 shown sandwiched between two layers of the elongate substrate 226. As will be understood by one having skill in the art, active elements, such as amplifiers, and passive elements, such as filters, may also be mounted or constructed on the elongate substrate.

Multiple antennas may be mounted on a single antenna mount. Each antenna thereby provides directivity in the azimuthal plane as well as a narrow beam in the vertical plane, and the antennas may be oriented to cover different azimuthal sectors. This can be done by mounting different collinear antennas around the antenna mast at the same height but pointing to different azimuthal sectors, or by mounting two or more antennas above each other pointing to the same or different azimuthal sectors. In fact, the azimuthal pointing of an antenna may be set independently of where it is mounted, but it is preferred that the antennas be directed so that there is no interference from the other antennas or the mast.

Figure 12:
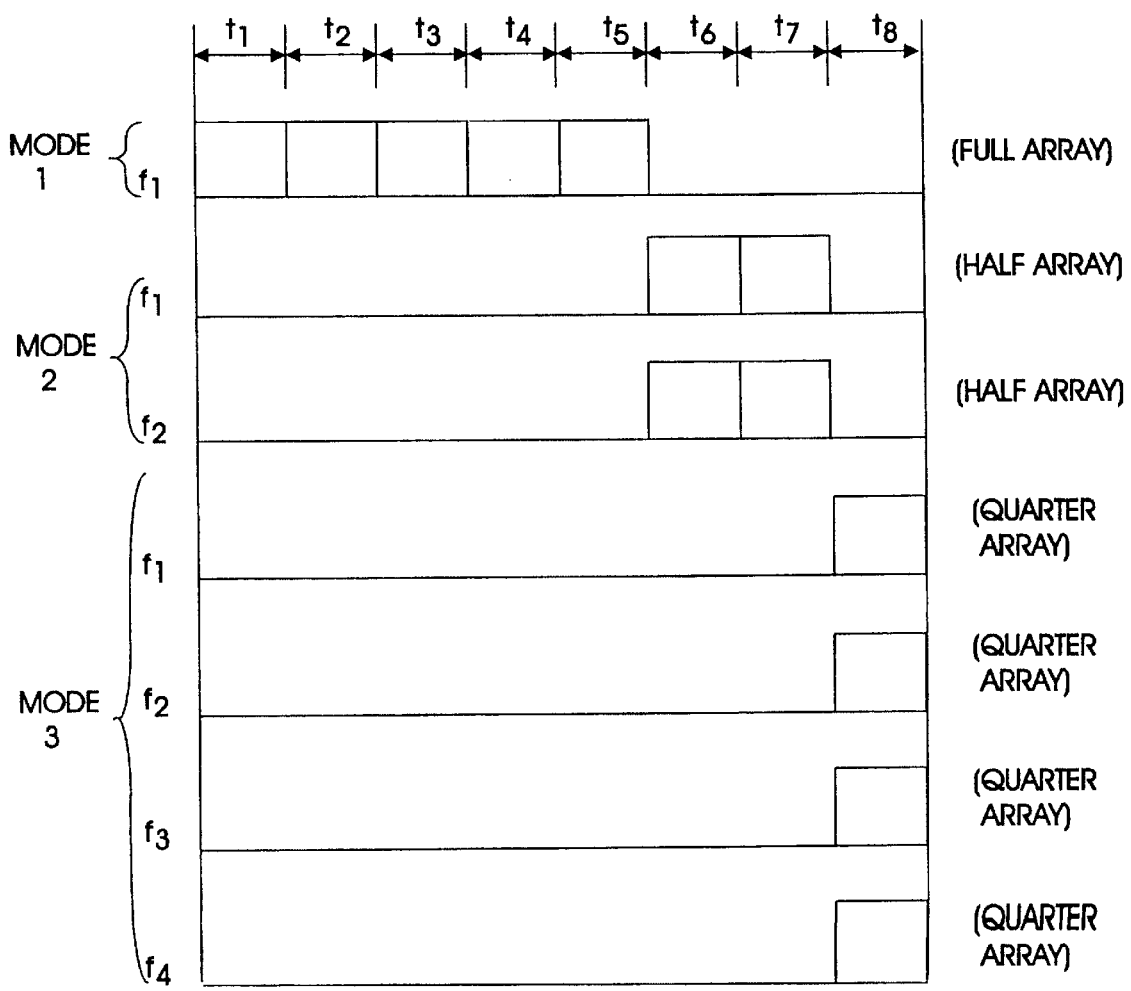
FIG. 12 is a diagram of an allocation of channels by frequency over time division multiple access (TDMA) time slots.

FIG. 12 illustrates the allocation of frequencies over TDMA time slots for a single antenna in a base station according to the present invention. As will be understood by one having skill in the art, a single frequency can be divided into a plurality of TDMA time slots defining a plurality of communications channels thereby allowing the transmission of a plurality of cellular radio signals over the single frequency. For example, the GSM standard protocol provides that each cellular frequency is divided into eight time slots $t_1$–$t_8$ per TDMA frame defining eight communications channels and allowing the transmission of eight cellular radio signals over a frequency.

In TDMA time slots 1–5, $t_1$–$t_5$ of FIG. 12, the antenna transmits over a single frequency $f_1$ from the full array of transmit antenna elements thereby providing five high power cellular radio signals. This high power transmission is referred to herein and in the Figures as Mode 1 Operation, and one high power cellular radio signal can be transmitted per time slot. In Mode 1 Operation, the RF switch 319 (shown in FIG. 9) provides the cellular radio signal having frequency $f_1$ to all of the transmit antenna elements 224 through respective transmit amplifiers 228 during respective time slots.

In TDMA time slots 6–7, $t_6$–$t_7$ of FIG. 12, the antenna transmits over one frequency $f_1$ from half of the array of antenna elements and over another frequency $f_2$ from the other half of the array of antenna elements thereby providing four medium power cellular radio signals. The effective radiated power in any direction may be reduced by 6 dB in this mode. This medium power transmission is referred to herein and in the Figures as Mode 2 Operation, and two medium power cellular radio signals can be transmitted per TDMA time slot. In Mode 2 Operation, the RF switch 319 (shown in FIG. 9) provides the cellular radio signals having frequencies $f_1$ and $f_2$ to respective halves of the array of transmit antenna elements 224 through respective transmit amplifiers 228 during respective TDMA time slots.

In TDMA time slot 8, $t_8$ of FIG. 12, the antenna transmits over four frequencies $f_1$–$f_4$ from respective fourths of the array of antenna elements thereby providing four low power cellular radio signals. This low power transmission is referred to herein and in the Figures as Mode 3 Operation, and four low power cellular radio signals can be transmitted per TDMA time slot. In Mode 3 Operation, the RF switch 319 (shown in FIG. 9) provides the cellular radio signals having frequencies $f_1$–$f_4$ to respective fourths of the array of transmit antenna elements 224 through respective transmit amplifiers 228 during respective TDMA time slots. Other modes are also achievable, such as transmitting with one frequency using ¾ of the elements and transmitting with another frequency using ¼ of the elements.

Figure 13:
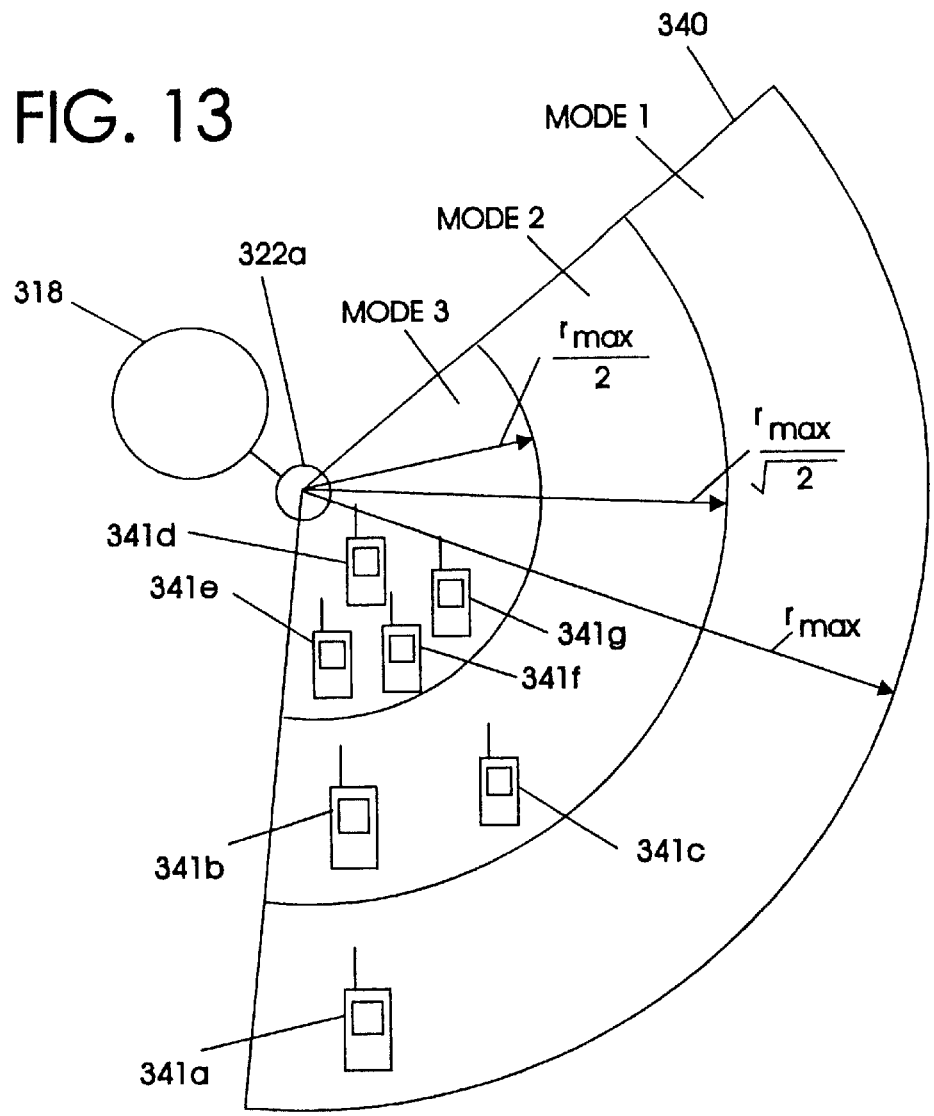
FIG. 13 is a top view of a portion of the base station of FIG. 6 illustrating an antenna and the respective transmit coverage areas associated with varying transmission powers.

The respective ranges of transmission for antenna 322a operating in Modes 1–3 are illustrated in FIG. 13. As shown, antenna 322a defines a 120° azimuthal transmit coverage area 340. Accordingly, three antennas evenly spaced around the base station 318 can provide three mode operation with 360° coverage. As discussed above with regard to FIG. 9, an antenna including eight transmit elements 224 can be divided into four sub-arrays of two transmit elements each, and each transmit element is driven by a respective transmit amplifier 228. Each of these amplifiers can be a 1 watt amplifier. Accordingly, a signal transmitted by all transmit elements in Mode 1 Operation can have 8 watts of power combined with maximum antenna directivity, a signal transmitted by four transmit elements in Mode 2 Operation can have 4 watts of power combined with a 3 dB-reduced directivity, and a signal transmitted by two transmit elements in Mode 3 Operation can have 2 watts of power combined with a 6 dB-reduced directivity.

Figure 14:
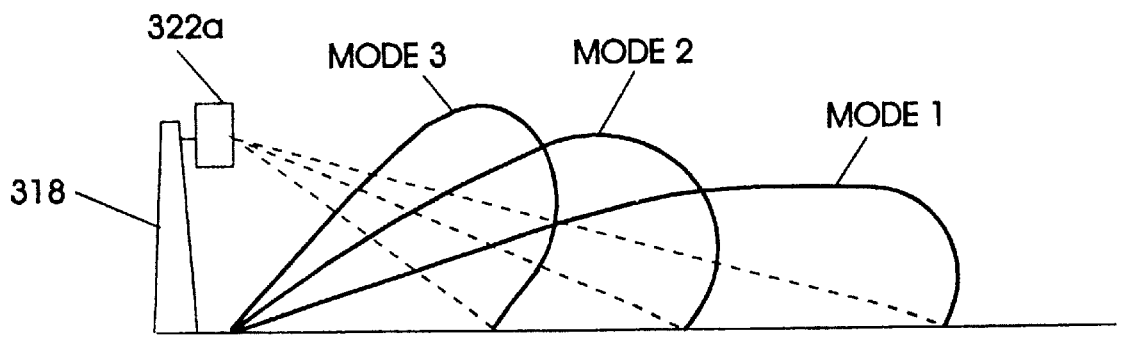
FIG. 14 is a side view of the transmit coverage areas of FIG. 13.

As shown in FIG. 13, a high power cellular transmit channel transmitted by the full array of transmit elements in Mode 1 Operation can extend to a full range $r_{max}$ of the antenna 322a. A medium power cellular transmit channel transmitted by half of the transmit elements in Mode 2 Operation at 6 dB less EIRP can extend to an intermediate range, such as $r_{max}/2^{1/2}$, of the antenna 322a, due to the fourth power of distance propagation law for cellular land-mobile radio systems. A low power cellular transmit channel transmitted by a quarter of the transmit elements in Mode 3 Operation at 12 dB less EIRP can extend to a shorter range, such as $r_{max}/2$. FIG. 14 illustrates the vertical beamwidths in each of the three modes of operation. Higher levels of power thus provide a greater range of transmission, while lower levels of power provide increased vertical beam width. Accordingly, higher levels of power can be used to transmit to more distant mobile stations, while lower levels of power can be used to transmit to mobile stations relatively close to the base station which may be positioned at a significant negative elevation angle relative to the antenna.

Stated in other terms, the antenna can transmit one full power cellular radio signal to one cellular mobile station 341a anywhere (such as within $r_{max}$) in the transmit coverage area 340 during a first TDMA time slot in Mode 1 Operation. The antenna can transmit two medium power cellular radio signals to two cellular mobile stations 341b–c within an intermediate range (such as within $r_{max}/\sqrt{2}$) in the transmit coverage area during a second TDMA time slot in Mode 2 Operation. The antenna can transmit four low power cellular radio signals to four cellular mobile stations 341d–g within a shorter range (such as within $r_{max}/2$) in the transmit coverage area during a third TDMA time slot in Mode 3 Operation. Further modes of operation can also be supported by the base station of the present invention. For example, the antenna can transmit one medium power cellular transmit channel and two low power cellular transmit channels during a TDMA time slot. For a uniform area distribution of mobiles, half the mobiles would be expected to lie between $r_{max}/\sqrt{2}$ and $r_{max}$, with ¼ each in the other two ranges. The number of time slots for each range can be allocated accordingly.

Figure 15:
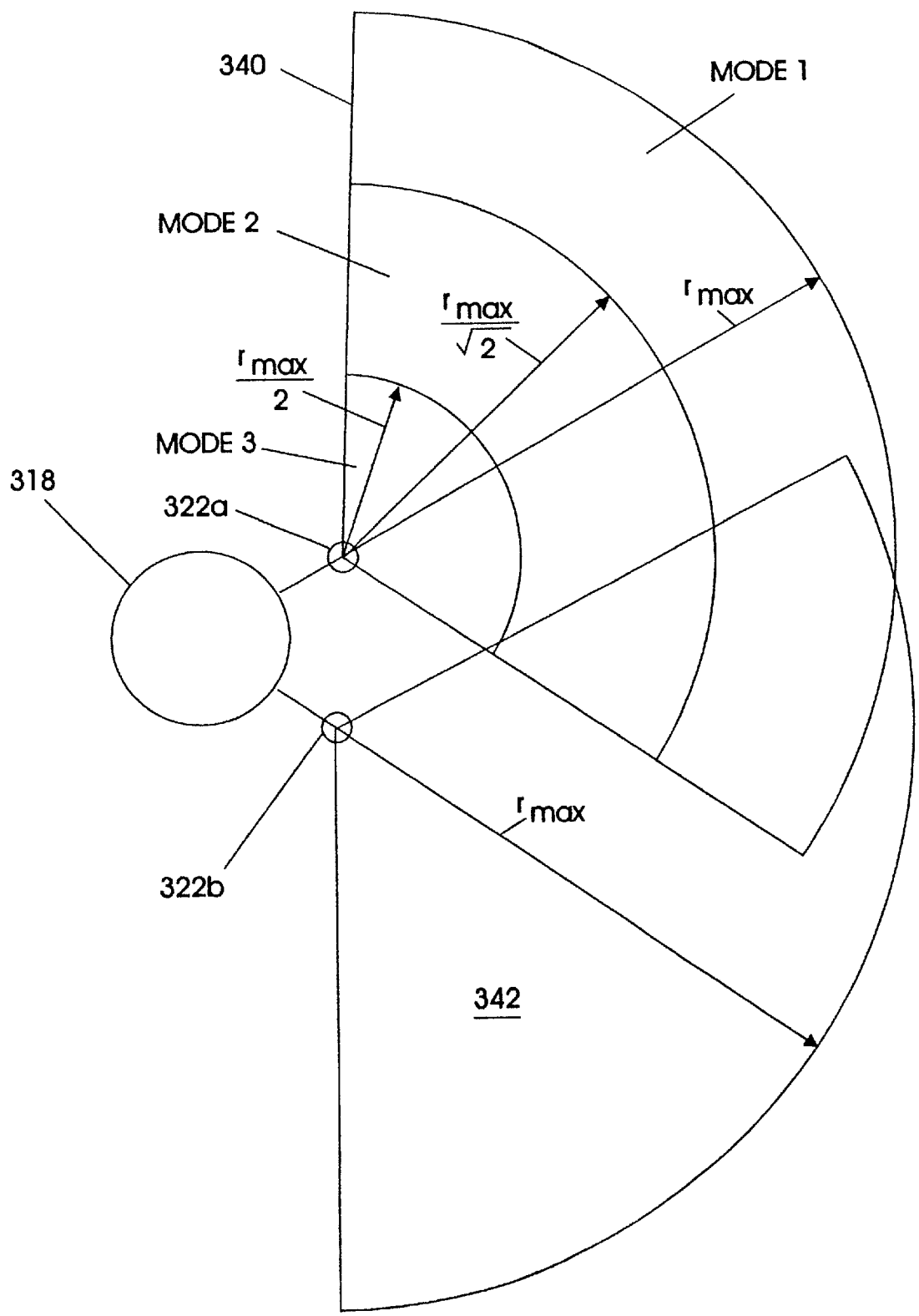
FIG. 15 is a top view of a portion of the base station of FIG. 6 illustrating two adjacent antennas and the respective transmit coverage areas.

Two adjacent antennas 322a and 322b from FIG. 7 together with respective receive coverage areas 340 and 342 are illustrated in FIG. 15. Antenna 322a and its respective transmit coverage area 340 having three ranges and three modes of operation is discussed in detail above with regard to FIGS. 13 and 14. Antenna 322b is spaced around the mast 318 approximately 60° from antenna 322a and defines a second transmit coverage area 342. Both transmit coverage areas extend approximately 120° in azimuth and therefor overlap. Accordingly, a mobile station in the overlap of the two regions can receive signals transmitted by both of the antennas.

Antenna 322b preferably includes an array of transmit antenna elements which simultaneously transmit signals having a single frequency $f_5$ during each TDMA time slot. This frequency $f_5$ is preferably different than those transmitted by adjacent antennas thereby reducing the possibility of interference between adjacent antennas. Accordingly, antenna 322b transmits over a single frequency at full power during every TDMA time slot.

The signals transmitted by antenna 322b are preferably transmitted during individual TDMA time slots as discussed above with regard to antenna 322a, and one of these time slots can be used to transmit a broadcast control signal. The time slot and frequency over which the broadcast control signal is transmitted define the broadcast control channel (BCH). As will be understood by one having skill in the art, the broadcast control signal is used to transmit cellular system information such as transmission frequencies, reception frequencies, and available channels, for example. In addition, the remaining TDMA time slots transmitted by antenna 322b at frequency $f_5$ are preferably transmitted at full power making the broadcast control signal easier to find by a scanning cellular mobile station.

Most preferably, data is transmitted on the control channel frequency at each TDMA time slot whether a communications channel is required or not. That is, dummy data can be transmitted if a communications channel is not required in one or more of the TDMA time slots making the broadcast control signal easier to locate. By providing the broadcast control channel on a frequency where data is transmitted during every TDMA time slot at full power, the requirements of the GSM standard protocol can be satisfied. Furthermore, by providing three antennas which operate on single frequencies spaced at 120° around the base station, a broadcast control signal can be provided over the entire azimuth range of the base station.

Figure 16:
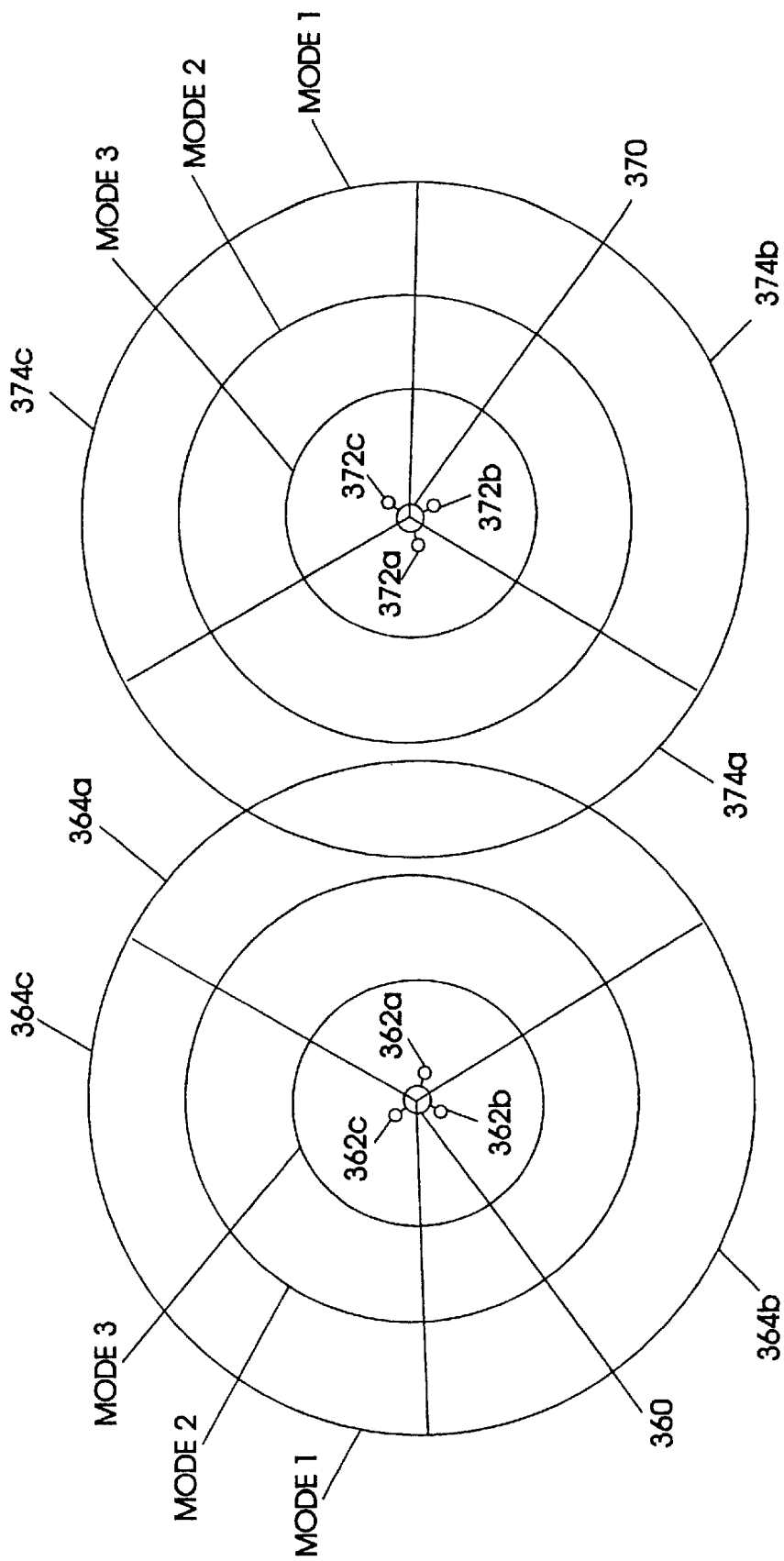
FIG. 16 is a top view of two adjacent base stations according to the present invention.

A cellular system including two adjacent cellular base stations 360 and 370 is shown in FIG. 16. As shown, each base station includes three respective antennas 362a–c and 372a–c defining respective transmit coverage areas 364a–c and 374a–c. For example, three antennas spaced evenly around each of the base stations and defining 120° azimuthal transmit coverage areas can cover a circular area around each base station. An overlap of the transmit coverage areas of the two base stations provides uninterrupted coverage between the two base stations.

Each antenna 362a–c and 372a–c preferably includes a plurality of transmit antenna elements which can be used to transmit one high power cellular radio signal during one TDMA time slot (Mode 1 Operation); two medium power cellular radio signals during another TDMA time slot (Mode 2 Operation); and four low power cellular radio signals during still another TDMA time slot (Mode 3 Operation); as discussed above. The ranges of transmission for each of these modes of operation are indicated by concentric circles around each base station labeled Mode 1, Mode 2, and Mode 3.

As shown, the transmit coverage area for antenna 362a of base station 360 during Mode 1 Operation, and the transmit coverage area for antenna 372a of base station 370 during Mode 1 Operation overlap. Accordingly, signals from these two antennas can interfere if transmitted over a common frequency during a common TDMA time slot. It is therefore preferable that one antenna use one frequency for Mode 1 Operation and the other antenna use another frequency for Mode 1 Operation. In order to maximize the reuse of available frequencies, it may be desirable that antennas 362a and 372a use a common set of frequencies.

As discussed above, antenna 362a can transmit one high power cellular radio signal with frequency $f_1$ during one TDMA time slot (Mode 1); transmit two medium power cellular radio signals with frequencies $f_1$ and $f_2$ during another TDMA time slot (Mode 2); and transmit four low power cellular radio signals with frequencies $f_1$, $f_2$, $f_3$ and $f_4$ during still another TDMA time slot (Mode 3). By properly allocating frequencies, antenna 372a can operate in all three modes with the same four frequencies without significant interference despite the overlap of transmit coverage areas. For example, antenna 372a can transmit one high power cellular radio signal with frequency $f_4$ during one TDMA time slot (Mode 1); transmit two medium power cellular radio signals with frequencies $f_3$ and $f_4$ during another TDMA time slot (Mode 2); and transmit four low power cellular radio signals with frequencies $f_1$, $f_2$, $f_3$ and $f_4$ during still another TDMA time slot (Mode 3).

Accordingly, even if antennas 362a and 372a both operate in Mode 1 during the same TDMA time slot, there will be insignificant interference because the transmissions will have different frequencies. If antenna 362a transmits a low power cellular radio signal over frequency $f_4$ (Mode 3) and antenna 372a transmits a high power cellular radio signal over frequency $f_4$ during the same TDMA time slot, there will be insignificant interference because there is no overlap of transmit coverage areas in these modes of operation.

Thus many degrees of freedom exist when base stations are time synchronized to ensure that the same frequencies are not selected at high power at the same time. In other words, by synchronizing the TDMA time slots of the two base stations, antennas 362a and 372a can both transmit over the same frequency at high power without significant interference as long as both antennas do not transmit the same frequency at high power during the same time slot. The synchronization of TDMA time slots of adjacent base stations is discussed for example in copending application Ser. No. 08/608,717, filed Feb. 29, 1996, and entitled "Time-Reuse And Code-Reuse Partitioning Systems And Methods For Cellular Radiotelephone Systems" to Paul Dent. This application is hereby incorporated herein in its entirety by reference. This application is assigned to the assignee of the present invention. Furthermore, each base station can transmit at high power over the same frequency during different TDMA time slots without significant interference as long as both base stations do not transmit over the same frequency during the same TDMA time slot.

Each of the three antennas on each base station preferably transmit with a unique set of four frequencies to reduce interference between adjacent antennas. As discussed above, however, the same twelve frequencies can be used by two adjacent base stations. In addition, the frequencies can be allocated so that overlapping transmit coverage areas of adjacent antennas do not use the same set of frequencies during the same time slot. While not shown in FIG. 16 for purposes of clarity, each base station 360 and 370 can also include additional antennas for transmitting a broadcast control signal as discussed above with regard to FIG. 15. The broadcast control channel frequencies of one site can be used at adjacent sites for low power transmissions (mode 3).

The present invention also encompasses a method for transmitting a plurality of cellular radio signals from a cellular base station to a plurality of mobile stations using a plurality of TDMA time slots. This method will be discussed with reference to FIG. 13. The method includes the step of transmitting a first cellular radio signal during a first TDMA time slot wherein the first cellular radio signal is transmitted at a first power level. This method also includes the step of transmitting a second cellular radio signal during a second TDMA time slot wherein the second radio signal is transmitted at a second power level less than the first power level. In addition, a third cellular radio signal can be transmitted during the second TDMA time slot wherein the third radio signal is transmitted at the second power level.

For example, the first cellular radio signal can be transmitted according to Mode 1 operation to a cellular mobile station 341a a distance $r_{max}$ from the base station. The second and third cellular radio signals can be transmitted according to Mode 2 operation to two cellular mobile stations 341b and 341c a distance $r_{max}/\sqrt{2}$ from the base station. In particular, the first and second radio signals can be transmitted at a first frequency and the third radio signal can be transmitted at a second frequency. There is insignificant interference between the first and second radio signals because each is transmitted during a different TDMA time slot. There is insignificant interference between the second and third cellular radio signals because each is transmitted at a different frequency.

The first, second, and third cellular radio signals can be transmitted from a common antenna on the base station. This antenna can include a plurality of patch antenna elements as discussed above. More particularly, the antenna can define a transmit coverage area with a 120° azimuthal pattern. Accordingly, three such antennas spaced evenly around the base station can provide 360° coverage. Preferably each antenna on the base station operates with a unique set of frequencies to reduce the possibility of interference between antennas on the base station.

A first cellular radio signal can be transmitted to a first mobile cellular station 341a a first distance from the base station, and second and third cellular radio signals can be transmitted to second and third mobile cellular stations 341b and 341c located second and third distances from the base station. In particular the first mobile cellular station can be located at a longer distance from the base station than the second and third mobile cellular stations.

A method can also include the step of transmitting fourth, fifth, sixth, and seventh cellular radio signals during a third TDMA time slot wherein the fourth, fifth, sixth, and seventh cellular radio signals are transmitted at a third power level less than said second power level. Accordingly, the fourth through seventh cellular radio signals can be transmitted to mobile stations 341$d$, 341$e$, 341$f$, and 341$g$, which are located relatively close to the base station. For instance, these mobile cellular stations may be located within a distance $r_{max}/2$ from the antenna.

The method may also include the step of transmitting a broadcast control signal over a predetermined frequency during a predetermined TDMA time slot at the first power level. Furthermore, energy can be transmitted over the predetermined frequency during every TDMA time slot at the first power level. Accordingly, the broadcast control signal can be transmitted in conformance with the GSM standard protocol.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications of these embodiments are intended to be included within the scope of the appended claims.

That which is claimed is:

1. A time division multiple access (TDMA) base station for communicating with a plurality of mobile stations in a cellular communications system using a plurality of time division multiple access (TDMA) time slots in a time division multiple access (TDMA) time frame, said base station comprising:

an antenna comprising an array of transmit antenna elements;

a modulator for generating a first cellular radio signal for transmission during a first time division multiple access (TDMA) time slot of the time division multiple access (TDMA) time frame, and for generating second and third cellular radio signals for simultaneous transmission during a second time division multiple access (TDMA) time slot of the time division multiple access (TDMA) time frame, wherein said second and third radio signals are generated and transmitted on different frequencies; and a radio frequency switch for coupling said first cellular radio signal to a first plurality of said transmit antenna elements for transmission during said first time division multiple access (TDMA) time slot of the time division multiple access time frame, and for coupling said second and third cellular radio signals to respective second and third pluralities of said transmit antenna elements for transmission during said second time division multiple access (TDMA) time slot of the time division multiple access time frame wherein said second and third pluralities of said transmit antenna elements each comprise different ones of said transmit antenna elements.

2. A base station according to claim 1 wherein said second and third pluralities of transmit antenna elements comprise respective mutually exclusive subsets of said first plurality of transmit antenna elements so that said first cellular radio signal is transmitted at a higher power during said first time slot of the time frame than said second and third cellular radio signals are transmitted during said second time slot of the time frame.

3. A base station according to claim 1 wherein each of said transmit antenna elements comprises at least one patch antenna element.

4. A base station according to claim 1 wherein each of said transmit antenna elements is an active element comprising a transmit power amplifier.

5. A base station according to claim 1 wherein said first and second cellular radio signals are generated on a common frequency.

6. A base station according to claim 1 wherein said modulator generates fourth, fifth, sixth, and seventh cellular radio signals on different frequencies for transmission during a third time division multiple access (TDMA) time slot, and wherein said radio frequency switch couples said fourth, fifth, sixth, and seventh cellular radio signals to respective fourth, fifth, sixth, and seventh pluralities of said transmit antenna elements during said third time division multiple access (TDMA) time slot.

7. A base station according to claim 1 each of said fourth, fifth, sixth, and seventh cellular radio signals is transmitted at a lower power than each of said first, second, and third cellular radio signals.

8. A base station according to claim 1 wherein said antenna defines a first transmit coverage area over which said first, second, and third cellular radio signals are transmitted, said base station further comprising:

a second antenna defining a second transmit coverage area overlapping at least a portion of said first transmit coverage area, wherein said second antenna transmits a broadcast control signal over a predetermined frequency during a predetermined time division multiple access (TDMA) time slot at a predetermined power level, and wherein energy is transmitted from said second antenna over said predetermined frequency during every time division multiple access (TDMA) time slot at said predetermined power level.

9. A base station according to claim 8 wherein said broadcast control signal conforms to a GSM standard protocol.

10. A time division multiple access (TDMA) base station for communicating with a plurality of mobile stations in a cellular communications system using a plurality of time division multiple access (TDMA) time slots in a time division multiple access (TDMA) time frame, said base station comprising:

an antenna comprising an array of transmit antenna elements;

high power transmit means for transmitting a high power cellular radio signal from a first plurality of said transmit antenna elements during a first time division multiple access (TDMA) time slot of the time division multiple access (TDMA) time frame; and low power transmit means for transmitting a low power cellular radio signal from a second plurality of said transmit antenna elements during a second time division multiple access (TDMA) time slot of the time division multiple access (TDMA) time frame wherein said first and second pluralities of said transmit antenna elements comprise different numbers of said transmit antenna elements.

11. A base station according to claim 10 wherein said second plurality of transmit elements is less than said first plurality of transmit elements so that said high power cellular radio signal is transmitted at a higher power than said low power cellular radio signal.

12. A base station according to claim 11 wherein said high power cellular radio signal is transmitted with greater directivity than said low power cellular radio signal.

13. A base station according to claim 10 wherein said high power cellular radio signal and said low power cellular radio signal are transmitted at a common frequency.

14. A base station according to claim 13 further comprising:

second lower power transmit means for transmitting a second low power cellular radio signal from a third plurality of said transmit antenna elements at a second frequency during said second time division multiple access (TDMA) time slot, wherein said second and third pluralities of transmit antenna elements comprise mutually exclusive subsets of transmit antenna elements from said first plurality of transmit antenna elements so that said high power cellular radio signal is transmitted at a higher power during said first time slot than said first and second low power cellular radio signals are transmitted during said second time slot.

15. A base station according to claim 10 further comprising:

medium power transmit means for transmitting a medium power cellular radio signal from a third plurality of said transmit antenna elements during a third time division multiple access (TDMA) time slot, wherein said third plurality of transmit elements is less than said first plurality of transmit elements and greater than said second plurality of transmit elements so that said high power cellular radio signal is transmitted at higher power than said medium power cellular radio signal, and said medium power cellular radio signal is transmitted at a higher power than said low power cellular radio signal.

16. A base station according to claim 10 wherein said high power cellular radio signal is transmitted to a first cellular mobile station a first distance from said antenna, and said low power cellular radio signal is transmitted to a second cellular mobile station a second distance from said antenna, wherein said first distance is longer than said second distance.

17. A base station according to claim 10 wherein said antenna defines a first transmit coverage area over which said high and low power cellular radio signals are transmitted, said base station further comprising:

a second antenna defining a second transmit coverage area overlapping at least a portion of said first transmit coverage area, wherein said second antenna transmits a broadcast control signal over a predetermined frequency during a predetermined time division multiple access (TDMA) time slot at a predetermined power level, wherein energy is transmitted from said second antenna over said predetermined frequency during every time division multiple access (TDMA) time slot at said predetermined power level.

18. A base station according to claim 17 wherein said broadcast control signal conforms to a GSM standard protocol.

19. A method for transmitting a plurality of cellular radio signals from a cellular base station to a plurality of mobile stations using a plurality of time division multiple access (TDMA) time slots in a TDMA frame, said method comprising the steps of:

transmitting a first cellular radio signal during a first time division multiple access (TDMA) time slot of the TDMA frame wherein said first cellular radio signal is transmitted at a first power level;

transmitting a second cellular radio signal during a second time division multiple access (TDMA) time slot of the TDMA frame wherein said second cellular radio signal is transmitted at a second power level less than said first power level; and transmitting a third cellular radio signal during said second time division multiple access (TDMA) time slot of the TDMA frame wherein said third cellular radio signal is transmitted at said second power level.

20. A method according to claim 19 wherein said first and second cellular radio signals are transmitted at a first frequency and said third cellular radio signal is transmitted at a second frequency.

21. A method according to claim 19 wherein said first, second, and third cellular radio signals are transmitted from a common antenna having an array of transmit antenna elements on said base station, wherein said first cellular radio signal is transmitted during said first time slot from a plurality of said transmit antenna elements, and wherein said second and third cellular radio signals are transmitted during said second time slot from respective mutually exclusive subsets of said plurality of transmit antenna elements.

22. A time division multiple access (TDMA) cellular system for communicating with a plurality of mobile stations, said cellular system comprising:

a first base station having a first antenna for transmitting a first cellular radio signal at a first power level during a first time division multiple access (TDMA) time slot, and for transmitting a second cellular radio signal at a second power level during a second time division multiple access (TDMA) time slot, wherein said first power level is high relative to said second power level; and a second base station adjacent said first base station, said second base station having a second antenna for transmitting a third cellular radio signal at a third power level during said second time division multiple access (TDMA) time slot and for transmitting a fourth cellular radio signal at a fourth power level during said first time division multiple access (TDMA) time slot, wherein said third power level is high relative to said fourth power level, thereby reducing interference between said first and second base stations wherein each of said first, second, third, and fourth cellular radio signals is transmitted over a common frequency.

23. A method according to claim 19 further comprising the step of:

transmitting fourth, fifth, sixth, and seventh cellular radio signals during a third time division multiple access (TDMA) time slot wherein said fourth, fifth, sixth, and seventh cellular radio signals are transmitted at a third power level lower than said second power level.

24. A method according to claim 19 further comprising the step of:

transmitting a broadcast control signal over a predetermined frequency during a predetermined time division multiple access (TDMA) time slot at said first power level, wherein energy is transmitted over said predetermined frequency during every time division multiple access (TDMA) time slot at said first power level.

25. A method according to claim 24 wherein said broadcast control signal conforms to a GSM standard protocol.

26. A time division multiple access (TDMA) cellular system for communicating with a plurality of mobile stations, said cellular system comprising:

a first base station having a first antenna for transmitting a first cellular radio signal at a first power level during a first time division multiple access (TDMA) time slot of a time division multiple access (TDMA) time frame, and for transmitting a second cellular radio signal at a second power level during a second time division multiple access (TDMA) time slot of the time division multiple access (TDMA) time frame, wherein said first power level is high relative to said second power level; and a second base station adjacent said first base station, said second base station having a second antenna for transmitting a third cellular radio signal at a third power level during said second time division multiple access (TDMA) time slot of the time division multiple access (TDMA) time frame and for transmitting a fourth cellular radio signal at a fourth power level during said first time division multiple access (TDMA) time slot of the time division multiple access (TDMA) time frame, wherein said third power level is high relative to said fourth power level, thereby reducing interference between said first and second base stations wherein each of said first, second, third, and fourth cellular radio signals is transmitted over a common frequency.

27. A time division multiple access (TDMA) cellular system according to claim 26 wherein said time division multiple access (TDMA) time slots of said first and second base stations are synchronized.

28. A time division multiple access (TDMA) cellular system according to claim 27 wherein:

said first cellular radio signal is transmitted from said first antenna over a first transmit coverage area and said second cellular radio signal is transmitted from said first antenna over a second transmit coverage area, said first transmit coverage area extending a greater distance from said first antenna than said second transmit coverage area;

said third cellular radio signal is transmitted from said second antenna over a third transmit coverage area and said fourth cellular radio signal is transmitted from said fourth antenna over a fourth transmit coverage area, said third transmit coverage area extending a greater distance from said second antenna than said fourth transmit coverage area;

said first transmit coverage area overlaps a portion of said third transmit coverage area;

said second transmit coverage area does not overlap said third and fourth transmit coverage areas; and said fourth transmit coverage area does not overlap said first and second transmit coverage areas.

29. A time division multiple access (TDMA) cellular system according to claim 26 wherein said first antenna transmits said second cellular radio signal over a first frequency and wherein said first antenna further transmits a fifth cellular radio signal over a second frequency at said second power level during said second time division multiple access (TDMA) time slot.

30. A cellular base station for transmitting different signals using TDMA to each of a plurality of mobile stations at different distances from the base station comprising:

timeslot and frequency allocation means for allocating a timeslot within a TDMA time frame and a frequency for transmitting to each mobile station in dependence on its distance from the base station;

radio frequency switching means having a number of radio frequency signal inputs and a number of radio frequency signal outputs and a control input for controlling separately for each output which input signal shall appear at that output during each TDMA time slot of the TDMA time frame;

multiple element antenna means for radiating signals each connected to respective outputs of said radio frequency switching means;

multiple transmit signal generation means for generating TDMA signal outputs each using a different frequency and each comprising the same number of timeslots of the TDMA time frame, information for a particular mobile being modulated on to its respectively allocated frequency during its allocated timeslot of the TDMA time frame, and each TDMA signal output being connected to a respective input of said radio frequency switching means during respective TDMA time slots of the TDMA time frame;

control means connected to said control input of said radio frequency switching means for controlling on a TDMA timeslot by timeslot basis of the TDMA time frame the selection of said switch input signals to appear on said switch outputs such that in at least one of said TDMA timeslots of the TDMA time frame at least one of said input signals appear on at least two of said outputs and in at least one other timeslot of the TDMA time frame at least two of said switch input signals each appear on different outputs.

31. A cellular base station according to claim 30 wherein said antenna elements are active transmitting elements comprising at least one radiating structure connected to at least one transmit power amplifier.

32. A cellular base station according to claim 31 wherein said radiating structure comprises one of a resonant patch antenna and a sub-array of patches.

33. A cellular base station according to claim 30 wherein said radio frequency switching means is constructed on an integrated circuit using amplifiers which can be enabled or disabled to effect a selection of input signal to become an amplified output signal.

34. A radio frequency switch for use in a phased array antenna transmitting Tiime Division Multiplex (TDM) signals in a number of time division multiplex (TDM) timeslots of a time division multiplex (TDM) time frame comprising:

a plurality of inputs for modulated time-division multiplexed radio frequency (TDM RF) signals;

a plurality of outputs for outputing selected ones of said TDM RF input signals;

selection means for selecting which of said input signals are output from each of said outputs;

memory means for storing for each of said TDM timeslots of the TDM timeframe a set of input to output signal selections that shall be used;

cycling means for retrieving said selections from said memory in synchronism with said TDM timeslots of the TDM time frame so that a first one of the TDM RF input signals is coupled to a first plurality of the outputs during a first TDM time slot of the TDM time frame, and second and third ones of the TDM RF input signals are coupled to mutually exclusive subsets of the first plurality of the outputs during a second TDM time slot of the TDM time frame.

35. A switch according to claim 34 further comprising programming means for varying said stored selections to adapt transmissions to a changing pattern of traffic to be transmitted.

36. A method according to claim 19 wherein said first, second, and third cellular radio signals are transmitted over a first transmit coverage area, said method further comprising the step of:

transmiting a broadcast control signal over a predetermined frequency during a predetermined time division multiple access (TDMA) time slot at a predetermined power level over a second transmit coverage area overlapping at least a portion of said first transmit coverage area, and wherein energy is transmitted over said predetermined frequency over said second transmit coverage area during every time division multiple access (TDMA) time slot at said predetermined power level.

37. A base station according to claim 30 wherein said first base station further comprises:

a second antenna defining a fifth transmit coverage area overlapping at least a portions of said first and second transmit coverage areas, wherein said second antenna transmits a broadcast control signal over a predetermined frequency during a predetermined time division multiple access (TDMA) time slot at a predetermined power level, and wherein energy is transmitted from said second antenna over said predetermined frequency during every time division multiple access (TDMA) time slot at said predetermined power level.

38. A base station according to claim 1:

wherein said modulator generates a fourth cellular radio signal for transmission during a third time division multiple access (TDMA) time slot; and wherein said radio frequency switch couples said fourth cellular radio signal to a fourth plurality of said transmit antenna elements during said third time division multiple access (TDMA) time slot;

wherein a number of transmit antenna elements of said first plurality of transmit antenna elements is greater than a number of transmit antenna elements of each of said second, third, and fourth pluralities of transmit antenna elements; and wherein a number of transmit antenna elements of each of said second and third pluralities of antenna elements are greater than a number of antenna elements of said fourth plurality of antenna elements so that said first cellular radio signal is transmitted at higher power from a greater number of antenna elements than said second and third cellular radio signals, and so that said second and third radio signals are each transmitted at a higher power from a greater number of antenna elements than said fourth radio signal.

39. A method according to claim 23 wherein the base station includes an antenna having a plurality of antenna elements:

wherein said first cellular radio signal is transmitted from a first plurality of said transmit antenna elements;

wherein said second and third cellular radio signals are transmitted by respective second and third pluralities of said transmit antenna elements with a number of transmit antenna elements of said first plurality of antenna elements being greater than a number of transmit antenna elements of each of said second and third pluralities of antenna elements;

wherein said fourth, fifth, sixth, and seventh cellular radio signals are transmitted by respective fourth, fifth, sixth, and seventh pluralities of antenna elements with a number of antenna elements of each of said first, second and third pluralities of transmit antenna elements being greater than a number of transmit antenna elements of each of said fourth, fifth, sixth, and seventh antenna elements so that so that said first cellular radio signal is transmitted at higher power from a greater number of transmit antenna elements than said second and third cellular radio signals, and so that said second and third cellular radio signals are transmitted at higher power from a greater number of transmit antenna elements than said fourth, fifth, sixth, and seventh cellular radio signals.

* * * * *